United States Patent
Ande et al.

(10) Patent No.: US 8,874,458 B1
(45) Date of Patent: *Oct. 28, 2014

(54) SYSTEM AND METHOD FOR MANAGING TRANSPORTATION TRANSACTIONS

(75) Inventors: Murali Ande, Flower Mound, TX (US); Tuell C. Green, Euless, TX (US)

(73) Assignee: American Airlines, Inc., Fort Worth, TX (US)

( * ) Notice: Subject to any disclaimer, the term of this patent is extended or adjusted under 35 U.S.C. 154(b) by 1244 days.

This patent is subject to a terminal disclaimer.

(21) Appl. No.: 12/350,160

(22) Filed: Jan. 7, 2009

Related U.S. Application Data

(63) Continuation-in-part of application No. 12/183,645, filed on Jul. 31, 2008.

(51) Int. Cl.
*G06Q 10/00* (2012.01)
*G06Q 50/00* (2012.01)

(52) U.S. Cl.
USPC .............. 705/7.22; 705/5; 705/7.12; 701/120

(58) Field of Classification Search
CPC ... G08G 5/0043; G08G 5/0082; G06Q 10/02; G06Q 10/025; G06Q 10/0631; G06Q 10/06312; G06Q 50/30
USPC ..................... 705/5, 6, 7.11, 7.12, 7.22–7.25; 701/120
See application file for complete search history.

(56) References Cited

U.S. PATENT DOCUMENTS

| | | | |
|---|---|---|---|
| 5,265,023 A * | 11/1993 | Sokkappa ..................... | 701/120 |
| 5,732,384 A * | 3/1998 | Ellert et al. .................... | 701/120 |
| 6,044,353 A | 3/2000 | Pugliese, III | |
| 6,108,636 A | 8/2000 | Yap et al. | |
| 6,161,097 A * | 12/2000 | Glass et al. ........................ | 705/6 |
| 6,314,361 B1 * | 11/2001 | Yu et al. ........................ | 701/120 |
| 6,408,276 B1 | 6/2002 | Yu et al. | |
| 6,721,714 B1 * | 4/2004 | Baiada et al. ................. | 705/7.13 |
| 2002/0107714 A1 | 8/2002 | Whitlock et al. | |
| 2002/0138194 A1 * | 9/2002 | Flynn et al. ................... | 701/120 |
| 2002/0177943 A1 * | 11/2002 | Beardsworth ................. | 701/120 |
| 2003/0139875 A1 * | 7/2003 | Baiada et al. ................. | 701/120 |
| 2003/0167109 A1 * | 9/2003 | Clarke et al. ....................... | 701/3 |
| 2003/0225598 A1 * | 12/2003 | Yu et al. ........................ | 705/5 |
| 2004/0054550 A1 * | 3/2004 | Cole et al. ........................ | 705/1 |
| 2005/0192701 A1 | 9/2005 | Ben-Ezra | |
| 2005/0216281 A1 * | 9/2005 | Prior ................................ | 705/1 |
| 2005/0246224 A1 | 11/2005 | McKanna et al. | |
| 2007/0043598 A1 * | 2/2007 | Bertram et al. ................... | 705/5 |
| 2007/0219833 A1 * | 9/2007 | Trautman ........................... | 705/5 |

(Continued)

FOREIGN PATENT DOCUMENTS

| | | | |
|---|---|---|---|
| WO | WO 2008/061793 A1 | 5/2008 | |
| WO | WO 2008061793 A1 * | 5/2008 | |

OTHER PUBLICATIONS

Eriksen, Collaborative Decision Making Information Management in Airports, 2002, IEEE 0-7803-7367-7/02.*

(Continued)

*Primary Examiner* — Daniel Vetter
(74) *Attorney, Agent, or Firm* — Haynes and Boone, LLP

(57) ABSTRACT

A system and method for managing transportation transactions according to which one or more vehicles such as, for example, airplanes, depart from a specific location such as, for example, an airline gate.

23 Claims, 24 Drawing Sheets

(56) References Cited

U.S. PATENT DOCUMENTS

| | | | |
|---|---|---|---|
| 2008/0215407 A1* | 9/2008 | Pachon et al. | 705/8 |
| 2009/0125357 A1* | 5/2009 | Vannette et al. | 705/8 |
| 2010/0042445 A1* | 2/2010 | Nicosia | 705/7 |

OTHER PUBLICATIONS

Fuhr, Robust Flight Scheduling—An Analytic Approach to Performance Evaluation and Optimization, Apr. 23, 2007.*

Schaefer, et al., Improving Airlines Operational Performance through Schedule Perturbation, Oct. 28, 2002.*

Arguello, et al., A Grasp for Aircraft Routing in Response to Groundings and Delays, 1997, J. of Combinatorial Optimization 5, 211-228.*

U.S. Appl. No. 12/183,645, filed Jul. 31, 2008, Niznik et al.

U.S. Appl. No. 12/349,926, filed Jan. 7, 2009, Tansupaswatdikul et al.

U.S. Appl. No. 12/350,178, filed Jan. 7, 2009, Osborne et al.

U.S. Appl. No. 61/143,075, filed Jan. 7, 2009, Green et al.

Jeff Bailey, "Airlines Work on Systems to Reduce Delays" The New York Times, Nov. 15, 2007, 4 pages, nytimes.com, N.Y., USA.

Office Action dated May 12, 2011 for U.S. Appl. No. 12/183,645.

Office Action dated Jul. 19, 2011 for U.S. Appl. No. 12/349,926.

Office Action dated Jun. 14, 2011 for U.S. Appl. No. 12/350,178.

Andrew J. Schaefer, "Improving Airline Operational Performance Through Schedule Perturbation" Department of Industrial Engineering, University of Pittsburgh, Pttsburgh, PA, Oct. 28, 2002, 12 pages.

Peter Eriksen, "Collaborative Decision Making Information Management in Airports" Eurocontrol Experimental Centre, Bretigny-sur-Ogre, France, from IEEE, 2002, 8 pages.

Brigitte Fuhr, "Robust Flight Scheduling—An Analytic Approach to Performance Evaluation and Optimization", Clausthal University of Technology, Lufthansa Airlines, Apr. 23, 2007, 19 pages.

Michael Arguello, "A Grasp for Aircraft Routing in Response of Groundings and Delays" Journal of Combinatorial Optimization, 1997, pp. 211-228.

* cited by examiner

Flight 2413 DFW - LAX  Gate C26

Scheduled 1000  ETD 1010

| | | | |
|---|---|---|---|
| Flight plan | under 11 mins | Arrival Gate | 47B |
| Gate available until | 1003 | Estimated LAX Arrival | 1114 |
| Flying Time | 184 mins | | |
| A/C | 0825 BWI IN 0800 | F/A | 1887 STL IN 0841 |
| Crew C/P | 2434 LAX IN 1429 | | |

Flight Search

Inbound Connections | Downline Connections | Incoming Flight 0825 BWI-DFW Connections | Inbound Crew/Aircraft

| Passengers | Bags | Flight # | Flight Origin | Arrival Gate | Connection Time (mins) | ETA | Flight Status |
|---|---|---|---|---|---|---|---|
| 10 | 9 | 0712 | TUL | D21 | 18 | 0941 | IN |
| 5 | 2 | 0447 | BDL | D31 | 21 | 0921 | IN |
| 3 | 0 | 3786 | GPT | B18 | 25 | 0917 | IN |
| 1 | 2 | 0616 | COS | A14 | 17 | 0916 | IN |
| 1 | 1 | 1841 | SAT | A16 | 17 | 0904 | IN |
| 1 | 0 | 3464 | LRD | B12B | 25 | 0902 | IN |

Alternate Flights for Flight 2413 DFW-LAX

| Flight # | Flight Date | Dep Sta | Arv Sta | Skd Dep | Latest Dep | Proj Dep | Wait Time (mins) | Available Seats |
|---|---|---|---|---|---|---|---|---|
| 1773 | 24OCT | DFW | LAX | 1120 | 1120 | 1120 | 80 | 50 |
| 2427 | 24OCT | DFW | LAX | 1220 | 1220 | 1225 | 145 | 20 |
| 2445 | 24OCT | DFW | LAX | 1410 | 1410 | 1410 | 250 | -1 |
| 2453 | 24OCT | DFW | LAX | 1505 | 1505 | 1505 | 305 | 8 |

FIG. 8

Flight 2413 DFW - LAX    Gate C26

| | |  | | |
|---|---|---|---|---|
| Scheduled 1000 | ETD 1010 | | | |
| Flight plan | under 11 mins | Arrival Gate | 47B | |
| Gate available until | 1003 | Estimated LAX Arrival | 1114 | |
| Flying Time | 184 mins | | | |
| A/C | 0825 BWI IN 0800 | F/A | 1807 STL IN 0841 | |
| Crew C/P | 2434 LAX IN 1429 | | | |

Inbound Connections | Downline Connections | Incoming Flight 0825 BWI-DFW Connections | Inbound Crew/Aircraft

| Passengers | Bags | Flight # | Flight Origin | Arrival Gate | Connection Time (mins) | ETA | Flight Status |
|---|---|---|---|---|---|---|---|
| 10 | 9 | 0712 | TUL | D21 | 18 | 0941 | IN |
| 5 | 2 | 0447 | BDL | D31 | 21 | 0921 | IN |
| 3 | 0 | 3786 | GPT | B18 | 25 | 0917 | IN |
| 1 | 2 | 0616 | COS | A14 | 17 | 0916 | IN |
| 1 | 1 | 1841 | SAT | A16 | 17 | 0904 | IN |
| 1 | 0 | 3464 | LRD | B12B | 25 | 0902 | IN |

Alternate Flights for Flight 2413 DFW-LAX

| Flight # | Flight Date | Dep Sta | Arv Sta | Skd Dep | Latest Dep | Proj Dep | Wait Time (mins) | Available Seats |
|---|---|---|---|---|---|---|---|---|
| 1773 | 24OCT | DFW | LAX | 1120 | 1120 | 1120 | 80 | 50 |
| 2427 | 24OCT | DFW | LAX | 1220 | 1220 | 1225 | 145 | 20 |
| 2445 | 24OCT | DFW | LAX | 1410 | 1410 | 1410 | 250 | -1 |
| 2453 | 24OCT | DFW | LAX | 1505 | 1505 | 1505 | 305 | 8 |

FIG. 9

Flight 2413 DFW - LAX    Gate C26

Scheduled 1000    ETD 1010

| | | |
|---|---|---|
| Flight plan | under 11 mins | Arrival Gate 47B |
| Gate available until | 1003 | Estimated LAX Arrival 1114 |
| Flying Time | 184 mins | |
| A/C | 0825 BWI IN 0800 | F/A  1887 STL IN 0841 |
| Crew C/P | 2434 LAX IN 1429 | |

Flight Search

Inbound Connections | Downline Connections | Incoming Flight 0825 BWI-DFW Connections | Inbound Crew/Aircraft

| Passengers | Bags | Flight # | Dep Station | Arv Station | Skd Dep ▲ | ETD | Dep Gate | Connection Time (mins) |
|---|---|---|---|---|---|---|---|---|
| 3 | 2 | 1936 | LAX | SFO | 1155 | On Time | 48A | 51 |
| 5 | 5 | 3027 | LAX | MRY | 1220 | On Time | 44B | 76 |
| 4 | 1 | 3043 | LAX | SBA | 1239 | On Time | 44G | 95 |
| 2 | 3 | 3005 | LAX | SBP | 1245 | On Time | 44K | 101 |
| 4 | 4 | 3081 | LAX | SBA | 1435 | On Time | 44C | 211 |
| 7 | 11 | 283 | LAX | HNL | 1520 | On Time | 47B | 256 |
| 2 | 1 | 1798 | LAX | SFO | 1820 | On Time | 46A | 436 |

Alternate Flights for Flight 2413 DFW-LAX

| Flight # | Flight Date | Dep Sta | Arv Sta | Skd Dep | Latest Dep | Proj Dep | Wait Time (mins) | Available Seats |
|---|---|---|---|---|---|---|---|---|
| 1773 | 24OCT | DFW | LAX | 1120 | 1120 | 1120 | 80 | 50 |
| 2427 | 24OCT | DFW | LAX | 1220 | 1220 | 1225 | 145 | 20 |
| 2445 | 24OCT | DFW | LAX | 1410 | 1410 | 1410 | 250 | -1 |
| 2453 | 24OCT | DFW | LAX | 1505 | 1505 | 1505 | 305 | 8 |

FIG. 10

Flight 2413 DFW - LAX    Gate C26

Scheduled 1000    ETD 1010

| Flight plan | under 11 mins | Arrival Gate | 47B |
|---|---|---|---|
| Gate available until | 1003 | Estimated LAX Arrival | 1114 |
| Flying Time | 184 mins | | |
| A/C | 0825 BWI IN 0800 | F/A | 1887 STL IN 0841 |
| Crew C/P | 2434 LAX IN 1429 | | |

Flight Search

Inbound Connections | Downline Connections | Incoming Flight 0825 BWI-DFW Connections | Inbound Crew/Aircraft

| Flight # | Flight Date | Dep Station | Dep Gate | Arv Station | Skd Dep | Proj Dep | Latest Dep |
|---|---|---|---|---|---|---|---|
| 1873 | 24OCT | DFW | A29 | ABQ | 0910 | 0904 | 0904 |
| 0421 | 24OCT | DFW | C17 | AUS | 0935 | 0935 | 0935 |
| 3469 | 24OCT | DFW | B21 | BTR | 1010 | 1010 | 1010 |
| 1361 | 24OCT | DFW | A24 | COS | 0930 | 0930 | 0930 |
| 0511 | 24OCT | DFW | D40 | COS | 1145 | 1145 | 1145 |
| 0070 | 24OCT | DFW | D30 | FRA | 1445 | 1445 | 1445 |
| 3255 | 24OCT | DFW | B39B | GGG | 0905 | 0901 | 0901 |

Alternate Flights for Flight 2413 DFW-LAX

| Flight # | Flight Date | Dep Sta | Arv Sta | Skd Dep | Latest Dep | Proj Dep | Wait Time (mins) | Available Seats |
|---|---|---|---|---|---|---|---|---|
| 1773 | 24OCT | DFW | LAX | 1120 | 1120 | 1120 | 80 | 50 |
| 2427 | 24OCT | DFW | LAX | 1220 | 1220 | 1225 | 145 | 20 |
| 2445 | 24OCT | DFW | LAX | 1410 | 1410 | 1410 | 250 | -1 |
| 2453 | 24OCT | DFW | LAX | 1505 | 1505 | 1505 | 305 | 8 |

FIG. 11

Flight 2413 DFW - LAX    Gate C26

Scheduled 1000    ETD 1010

| | | | |
|---|---|---|---|
| Flight plan | under 11 mins | Arrival Gate | 47B |
| Gate available until | 1003 | Estimated LAX Arrival | 1114 |
| Flying Time | 184 mins | | |
| A/C | 0825 BWI IN 0800 | F/A | 1887 STL IN 0841 |
| Crew C/P | 2434 LAX IN 1429 | | |

Inbound Connections | Downline Connections | Incoming Flight 0825 BWI-DFW Connections | Inbound Crew/Aircraft — 98

| Flight # | Skd Arv | ETA | Flight Status | Passenger Count |
|---|---|---|---|---|
| 0825 | 0810 | 0800 | IN | 81 |

| Base | Position | Name | Flight # | Flight Status | ETA | Gate |
|---|---|---|---|---|---|---|
| SLT | 01 | | 1887 | | | C29 |
| SLT | 04 | | 1887 | | | C29 |
| SLT | 03 | | 1887 | | | C29 |
| SLT | 02 | | 1887 | | | C29 |

Alternate Flights for Flight 2413 DFW-LAX

| Flight # | Flight Date | Dep Sta | Arv Sta | Skd Dep | Latest Dep | Proj Dep | Wait Time (mins) | Available Seats |
|---|---|---|---|---|---|---|---|---|
| 1773 | 24OCT | DFW | LAX | 1120 | 1120 | 1120 | 80 | 50 |
| 2427 | 24OCT | DFW | LAX | 1220 | 1220 | 1225 | 145 | 20 |
| 2445 | 24OCT | DFW | LAX | 1410 | 1410 | 1410 | 250 | -1 |
| 2453 | 24OCT | DFW | LAX | 1505 | 1505 | 1505 | 305 | 8 |

Flight Search

Flight 2040 DFW - STL    Gate A36

| | | | |
|---|---|---|---|
| Scheduled 1825 | ETD 1835 | | |
| Today's flight plan is not published yet | | Arrival Gate | C16 |
| Gate available until | 1828 | Skd STL Arrival | 2000 |
| Flying Time | 92 mins | Est STL Arrival | 2007 |
| A/C | 2040 AUS IN 1730 | F/A | 2040 AUS IN 1730 |
| Crew C/P | 1059 MCI IN 1657 | | |

78 — Target

Flight Search

Inbound Connections | Downline Connections | Incoming Flight 2040 AUS-DFW Connections | Inbound Crew/Aircraft

| Passengers | Bags | Flight # | Flight Origin | Arrival Gate | Connection Time (mins) | ETA | Flight Status |
|---|---|---|---|---|---|---|---|
| 1 | 0 | 1760 | DEN | C36 | 15 | 1820 | CHO |
| 2 | 1 | 1694 | OMA | A9 | 43 | 1752 | IN |
| 1 | 0 | 3404 | BTR | D14 | 61 | 1734 | IN |
| 1 | 0 | 3388 | TYS | B24 | 64 | 1731 | IN |
| 9 | 3 | 0875 | TUS | D38 | 69 | 1726 | IN |
| 1 | 0 | 3608 | SGF | B7 | 72 | 1723 | IN |
| 2 | 1 | 1542 | OKC | A33 | 73 | 1722 | IN |

Alternate Flights for Flight 2040 DFW-STL

| Flight # | Flight Date | Dep Sta | Arv Sta | Skd Dep | ETD | Wait Time (mins) | Available Seats |
|---|---|---|---|---|---|---|---|
| 1206 | 04DEC | DFW | STL | 2000 | 2000 | 85 | 93 |
| 2226 | 04DEC | DFW | STL | 2105 | 2105 | 150 | 107 |

Flight 0843 DFW - IAH    Gate C2

| Scheduled 1735 | ETD 1750 | | | Target |
|---|---|---|---|---|
| Today's flight plan is 3 mins shorter. | Arrival Gate | A29 | | 1750 |
| Gate available until | 1906 | Skd IAH Arrival | 1845 | Posted ETD |
| Flying Time | 67 mins | Est IAH Arrival | 1857 | |
| A/C | 0436 LAX IN 1715 | F/A | 0843 DCA IN 1625 | |
| Crew C/P | ORIG ---- ---- ---- | | | |

Inbound Connections | Downline Connections | Incoming Flight 0436 LAX-DFW Connections | Inbound Crew/Aircraft

| Passengers | Bags | Flight # | Flight Origin | Arrival Gate | Connection Time (mins) | ETA | Flight Status |
|---|---|---|---|---|---|---|---|
| 3 | 1 | 3688 | MSN | B27 | 52 | 1658 | IN |
| 4 | 3 | 0620 | RNO | A36 | 67 | 1643 | IN |
| 1 | 0 | 1516 | ELP | C25 | 74 | 1636 | IN |
| 1 | 1 | 0569 | BDL | C8 | 81 | 1629 | IN |
| 1 | 0 | 0745 | LGA | A39 | 90 | 1620 | IN |
| 1 | 1 | 3562 | PNS | B18 | 93 | 1617 | IN |
| 3 | 1 | 3784 | FSM | B23 | 94 | 1616 | IN |

Alternate Flights

| Flight # | Flight Date | Dep Sta | Arv Sta | Skd Dep | ETD | Wait Time (mins) | Available Seats |
|---|---|---|---|---|---|---|---|
| 1300 | 04DEC | DFW | IAH | 1940 | 1940 | 110 | 72 |

Flight Search

FIG. 19B

Flight 0661 DFW - ONT  Gate A18

Scheduled 1930   ETD 1930

Today's flight plan is 1 min longer.   Arrival Gate: 410
Gate available until: 1920                Est ONT Arrival: 2046
Flying Time: 196 mins
A/C: 0661 BNA IN 1819   F/A: 0440 ONT IN 1643
Crew G/P: 0661 BNA IN 1819

Target: 1930 — As Scheduled — 78, 124, 126

Flight Search

Incoming Flight 0661 BNA-DFW Connections

| Passengers | Bags | Flight # | Flight Origin | Arrival Gate | Connection Time (mins) | ETA | Flight Status |
|---|---|---|---|---|---|---|---|
| 2 | 2 | 1391 | IND | C21 | 8 | 1922 | CHO |
| 1 | 2 | 1576 | SAT | A21 | 17 | 1913 | CHO |
| 3 | 0 | 1085 | TPA | A35 | 62 | 1828 | IN |
| 2 | 1 | 1057 | MCI | C36 | 67 | 1823 | IN |
| 5 | 6 | 1227 | MSP | A16 | 73 | 1817 | IN |
| 1 | 1 | 1181 | PHL | C8 | 76 | 1814 | IN |
| 1 | 1 | 1355 | JAX | A10 | 78 | 1812 | IN |

Alternate Flights

| Flight # | Flight Date | Dep Sta | Arv Sta | Skd Dep | ETD | Wait Time (mins) | Available Seats |
|---|---|---|---|---|---|---|---|
| 1003 | 04MAR | DFW | ONT | 2150 | 2150 | 140 | 74 |

FIG. 20

Flight 1433 DFW-SNA    Gate A20

Scheduled 1545    ETD 1545

| | | | |
|---|---|---|---|
| Today's flight plan is 10 mins shorter. | Arrival Gate | 8 | |
| Gate available until | 1642 | Est SNA Arrival | 1650 |
| Flying Time | 185 mins | | |
| A/C | 1433 FLL IN 1416 | F/A | |
| Crew C/p * | 1433 FLL IN 1416 | ORIG --- --- | |

Target: 1550    Hold

Inbound Connections | Downline Connections | Incoming Flight 1433 FLL-DFW Connections | Inbound Crew/Aircraft

| Passengers | Bags | Flight # | Flight Origin | Arrival Gate | Connection Time (mins) | ETA | Flight Status |
|---|---|---|---|---|---|---|---|
| 1 | 0 | 1408 | RIC | A15 | 16 | 1529 | ON |
| 5 | 5 | 1344 | SAT | C24 | 30 | 1515 | IN |
| 2 | 1 | 0731 | LGA | C6 | 47 | 1458 | IN |
| 2 | 3 | 2023 | MCI | A33 | 52 | 1453 | IN |
| 2 | 1 | 1827 | BNA | A37 | 68 | 1437 | IN |
| 1 | 4 | 0418 | AUS | C37 | 69 | 1436 | IN |
| 1 | 0 | 2102 | PTY | D15 | 73 | 1432 | IN |

Alternate Flights for Flight 1433 DFW-SNA

| Flight # | Flight Date | Dep Sta | Arv Sta | Skd Dep | ETD | Wait Time (mins) | Available Seats |
|---|---|---|---|---|---|---|---|
| 0743 | 15FEB | DFW | SNA | 1645 | 1645 | 60 | 22 |
| 0751 | 15FEB | DFW | SNA | 1840 | 1840 | 175 | 27 |
| 1747 | 15FEB | DFW | SNA | 2115 | 2115 | 330 | 11 |

Flight Search

FIG. 21

Flight 1669 DFW - SNA    Gate C21

Scheduled 0910    ETD 0910

Today's flight plan is 13 mins longer.    Arrival Gate    8

Gate available until    0935    Est SNA Arrival    1038

Flying Time    208 mins

A/C    1274 DEN IN 2208    F/A    2014 SNA IN 2057

Crew C/P    1669 MSY ON 0823

Target

0900

*Early*

Flight Search

Inbound Connections | Downline Connections | Incoming Flight Connections | Inbound Crew/Aircraft

| Passengers | Bags | Flight # | Flight Origin | Arrival Gate | Connection Time (mins) | ETA | Flight Status |
|---|---|---|---|---|---|---|---|
| 1 | 0 | 3534 | LIT | B9A | 35 | 0835 | ON |
| 2 | 3 | 0817 | SAT | A26 | 39 | 0831 | ON |
| 1 | 0 | 0689 | MSP | C6 | 41 | 0829 | ON |
| 1 | 0 | 2301 | ORD | A33 | 47 | 0823 | ON |
| 1 | 0 | 1107 | DCA | C2 | 49 | 0821 | IN |
| 1 | 0 | 3780 | FWA | B18 | 52 | 0818 | IN |
| 1 | 1 | 1997 | RDU | C29 | 56 | 0814 | IN |

Alternate Flights for Flight 1669 DFW-SNA

| Flight # | Flight Date | Dep Sta | Arv Sta | Skd Dep | ETD | Wait Time (mins) | Available Seats |
|---|---|---|---|---|---|---|---|
| 1779 | 25FEB | DFW | SNA | 1005 | 1005 | 55 | 22 |
| 1743 | 25FEB | DFW | SNA | 1115 | 1115 | 125 | 31 |
| 0617 | 25FEB | DFW | SNA | 1200 | 1200 | 170 | 52 |
| 1273 | 25FEB | DFW | SNA | 1315 | 1315 | 245 | 50 |

FIG. 22

SYSTEM AND METHOD FOR MANAGING TRANSPORTATION TRANSACTIONS

CROSS REFERENCE TO RELATED APPLICATIONS

This application is a continuation-in-part of U.S. patent application Ser. No. 12/183,645, filed on Jul. 31, 2008, now U.S. Pat. No. 8,615,418, issued Dec. 24, 2013, the disclosure of which is incorporated herein by reference.

This application is related to (1) U.S. patent application Ser. No. 12/183,645, filed on Jul. 31, 2008, now U.S. Pat. No. 8,615,418, issued Dec. 24, 2013; (2) U.S. patent application No. 61/143,075, filed on Jan. 7, 2009; (3) U.S. patent application Ser. No. 12/349,926, filed on Jan. 7, 2009, now U.S. Pat. No. 8,688,496, issued Apr. 1, 2014; and (4) U.S. patent application Ser. No. 12/350,178, filed on Jan. 7, 2009, now U.S. Pat. No. 8,731,990, issued May 20, 2014, the disclosures of which are incorporated herein by reference.

BACKGROUND

The present disclosure relates in general to a system and method for managing transportation transactions such as, for example, air, land and/or sea transportation transactions, and in particular to a system and method for managing one or more transactions during which one or more vehicles depart from a specific location such as, for example, one or more transactions during which one or more airplanes depart from an airline gate.

BRIEF DESCRIPTION OF THE DRAWINGS

FIGS. 8, 9, 10, 11 and 12 are diagrammatic illustrations of portions of output generated during the step of FIG. 7, according to respective exemplary embodiments.

Figure 14:
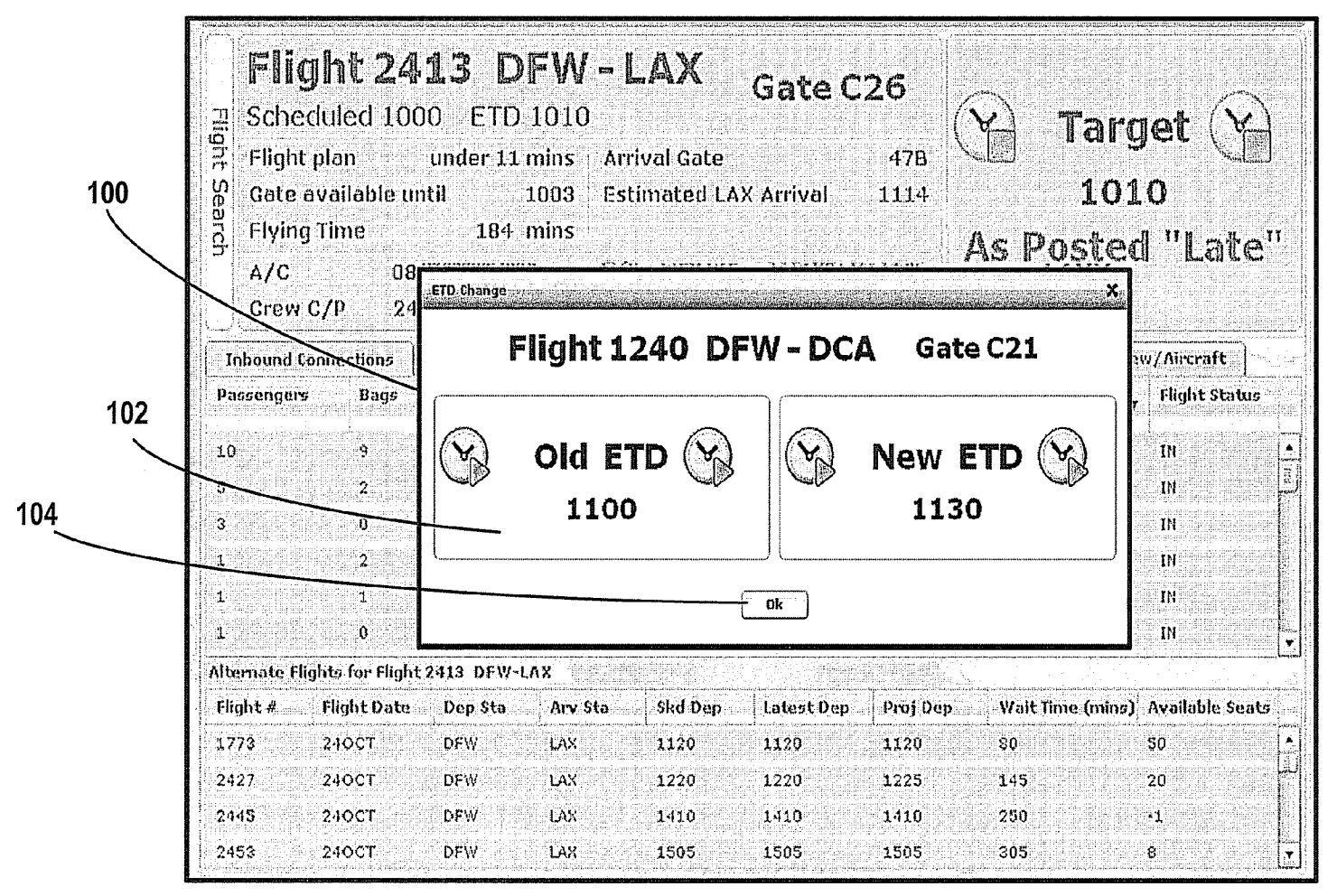

FIGS. 14, 15 and 16 are diagrammatic illustrations of portions of output generated during the step of FIG. 13, according to respective exemplary embodiments.

FIGS. 18, 19A, 19B, 20, 21 and 22 are diagrammatic illustrations of portions of output generated during the step of FIGS. 17A, 17B and 17C, according to respective exemplary embodiments.

DETAILED DESCRIPTION

Figure 1:
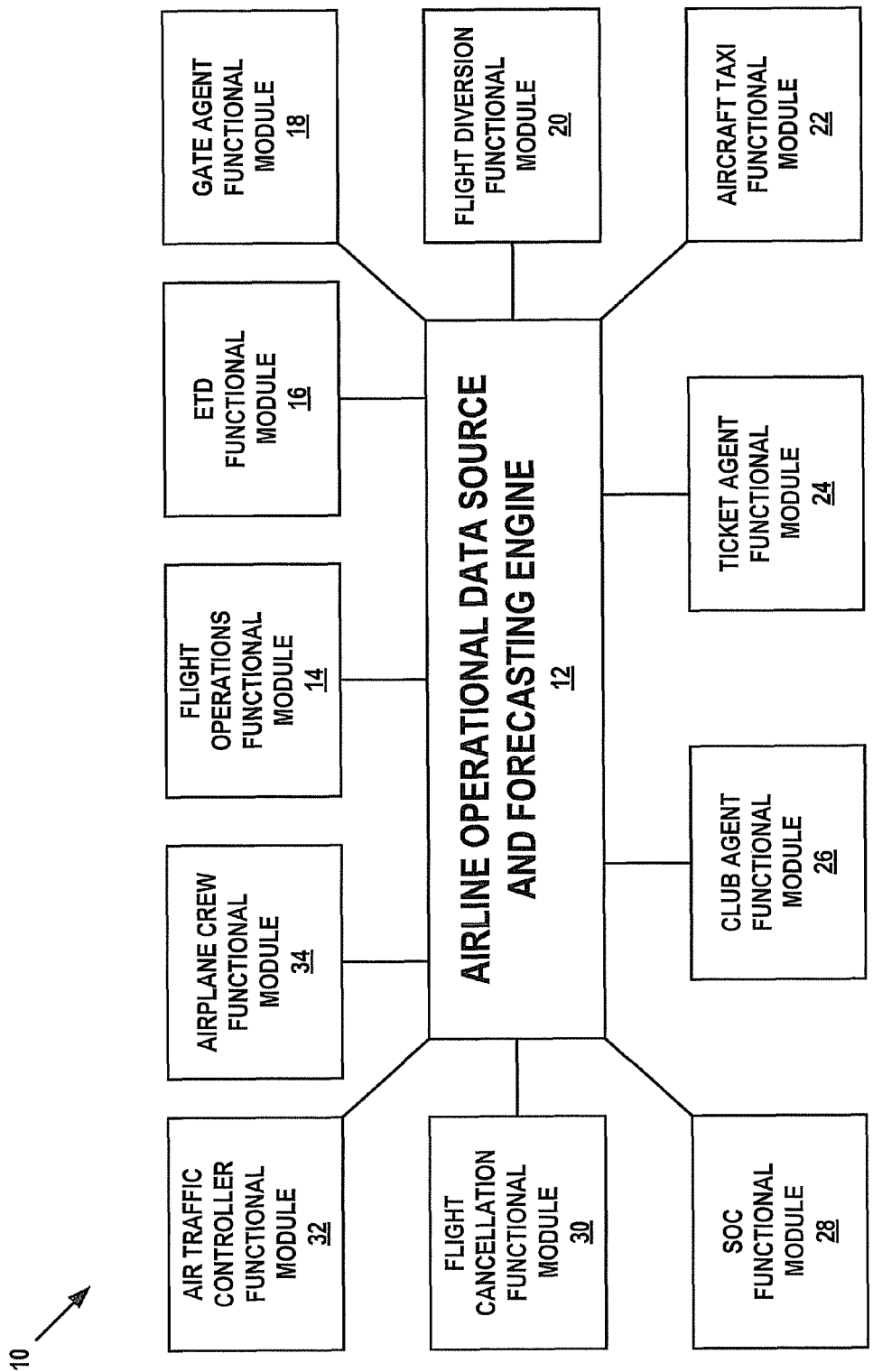
FIG. 1 is a diagrammatic illustration of a system according to an exemplary embodiment, the system including an airline operational data source and forecasting engine, and functional modules operably coupled to the engine, the functional modules including a gate agent functional module, according to respective exemplary embodiments.

In an exemplary embodiment, as illustrated in FIG. 1, a system is generally referred to by the reference numeral 10 and includes an airline operational data source and forecasting engine 12. Functional modules are operably coupled to, and in communication with, the engine 12, namely a flight operations functional module 14, an Estimated Time of Departure (ETD) functional module 16, a gate agent functional module 18, a flight diversion functional module 20, an aircraft taxi functional module 22, a ticket agent functional module 24, a club agent functional module 26, a system operations control (SOC) functional module 28, a flight cancellation functional module 30, an air traffic controller functional module 32, and an airplane crew functional module 34.

In several exemplary embodiments, one or more of the functional modules 14, 16, 18, 20, 22, 24, 26, 28, 30, 32 and 34 are in two-way communication with the engine 12. In several exemplary embodiments, one or more of the functional modules 14, 16, 18, 20, 22, 24, 26, 28, 30, 32 and 34 are in one-way communication with the engine 12. In several exemplary embodiments, one or more of the functional modules 14, 16, 18, 20, 22, 24, 26, 28, 30, 32 and 34 are in wireless communication with the engine 12. In several exemplary embodiments, one or more of the functional modules 14, 16, 18, 20, 22, 24, 26, 28, 30, 32 and 34 are operably coupled to, and in communication with, the engine 12 via a network, such as, for example, the Internet, any type of local area network, any type of wide area network, any type of wireless network, any type of voice network, any type of data network, and/or any combination thereof.

In several exemplary embodiments, one or more of the engine 12 and the functional modules 14, 16, 18, 20, 22, 24, 26, 28, 30, 32 and 34 include a computer readable medium or memory having a plurality of instructions stored therein, which instructions are accessible to, and executable by, a processor. In several exemplary embodiments, one or more of the engine 12 and the functional modules 14, 16, 18, 20, 22, 24, 26, 28, 30, 32 and 34 include one or more data structures or databases, which databases are accessible to a processor. In several exemplary embodiments, one or more of the engine 12 and the functional modules 14, 16, 18, 20, 22, 24, 26, 28, 30, 32 and 34 include a processor, a computer readable medium or memory operably coupled to the processor, a plurality of instructions stored in the computer readable medium and accessible to, and executable by, the processor, and one or more data structures or databases stored in the computer readable medium and accessible to the processor.

In an exemplary embodiment, the engine 12 provides data collection and management functionality. The engine 12 collects and stores real-time data from multiple sources and provides integrated data forecasts to the functional modules 14, 16, 18, 20, 22, 24, 26, 28, 30, 32 and 34. In an exemplary embodiment, the data collected by the engine 12 includes latest published flight times and status, latest gate assignments, aircraft rotations, crew sequence information, passenger counts and connections, baggage counts and connections, crew legality information, curfew information, and slot restrictions. Additionally, the engine 12 is capable of generating forecasts of downline impacts as a result of existing delays throughout the system.

In an exemplary embodiment, the engine 12 issues a query for all flight data. In one embodiment, a flight operating system may respond to the query with flight data and crew data in raw form covering the time period 144 hours after the time of the query was made. The flight data includes:

flight number: an identifier for the flight,
destination: the destination for the current flight,
scheduled departure: the time that the aircraft is scheduled to pull back from the gate,
published departure time: the published time that the aircraft is scheduled to pull back from the gate,
target departure: the time that the aircraft is targeted to pull back from the gate (associated with the variable departure calculations associated with the functional module 18),
projected departure: a forecasted departure time based on the propagation forecast,
departure delay: the time that the departure has been delayed,
scheduled arrival: the time that the aircraft is scheduled to pull up to a gate,
published arrival time: the published time that the aircraft is scheduled to pull up to a gate.
projected arrival: a forecasted arrival time based on the propagation forecast,
scheduled block time: number of minutes that reflects the difference between scheduled arrival time and scheduled departure time,
block difference: the difference between the scheduled block time and the flight plan,
missed connections: the number of customers that might miss a connection,
hold connections: the number of minutes a flight needs to be delayed to allow at least one of the missed connection passengers to make a connecting flight,
hold arrive on-time: the number of minutes a flight could be delayed and still arrive on time,
departure gate: the gate from which the aircraft is departing.
arrival gate: the gate at which the aircraft is arriving,
cost index: a numerical value associated with the cost of fuel based on the speed of flying,
downline destination: the destination of the next flight for the aircraft,
downline turn: time that the aircraft is scheduled on the ground at the downline station before the next flight of the aircraft, and
slack: minutes above the planned minimum time of ground time at the down-line station before the next flight of the aircraft.

In an exemplary embodiment, the engine 12 also obtains or accesses passenger data. The passenger data is obtained every four hours and contains real-time booking information covering a 72 hour period. In another embodiment, the passenger data is requested or obtained each time a change occurs on a flight if the flight's load factor exceeds a predetermined threshold. In an exemplary embodiment, the passenger data includes names, club member identification numbers, passenger number record, connecting flight information, and bag information. Further, the engine 12 may obtain ADL files from a governmental organization (e.g., the Federal Aviation Administration), cargo information (such as unit, weight, connection information, and priority), and maintenance information for each aircraft.

In an exemplary embodiment, the flight operations functional module 14 is an integrated station view of flight operations data. The flight operations functional module 14 provides operational information and decision support to tower and operations personnel. The operational information includes departure holds to reduce misconnects, early departures, ETD posting, and identifying gate conflicts. A user interface displays flight information (including departure and arrival times and flight plans), gate information, potential misconnect passengers, same day protection options for misconnect passengers, and incoming connecting passenger information. The module 14 may perform analysis of the integrated data provided to the engine 12 to recommend holding departures or indicate that departures can be held.

In an exemplary embodiment, the functional module 16 automatically posts estimated times of departures (ETDs) based on delayed inbound resources (such as aircraft and/or crew). In an exemplary embodiment, the ETD functional module 16 enables each gate at an airport to have its own posting rules. In an exemplary embodiment, the ETD functional module 16 has a user interface that displays gates at airports, allows the creation of groups of gates to allow posting rules to a pre-defined subset of gates, and enables the setting of ETD posting criteria and thresholds.

In an exemplary embodiment, the gate agent functional module 18 provides gate agents with operational information for a specific flight. In an exemplary embodiment, the gate agent functional module 18 has a user interface that displays flight information (including ETD, gate information, flight, and inbound aircraft information, information about inbound connections, downline connections, and inbound crew and aircraft) and information about alternative flights traveling to the destination to which a passenger is headed but unable to make the originally ticketed connecting flight.

In an exemplary embodiment, the aircraft taxi functional module 22 monitors flights system-wide for taxi times that exceed a desired time threshold and provides a user interface that is user-customizable to enable tracking and monitoring of taxi tames. In an exemplary embodiment, the aircraft taxi functional module 22 also generates text message alerts to designated personnel that one or more flights have exceeded certain thresholds for taxi-in or taxi-out. In an exemplary embodiment, the desired time threshold is three hours.

In an exemplary embodiment, the ticket agent functional module 24 provides information to ticket count agents about flights that are experiencing some type of disruption (such as delays, mechanical problems, or crew problems). In an exemplary embodiment, the ticket agent functional module 24 alerts ticket counter agents about possible flight disruptions when processing passengers associated with flights that may have disruptions. In an exemplary embodiment, the ticket agent functional module 24 captures check-in data for passengers and alerts the agent if a flight disruption is expected for that passenger's flight.

In an exemplary embodiment, the club agent functional module 26 provides specialty agents with flight information for designated passengers. In exemplary embodiment, when a designated passenger visits a designated guest area, the designated passenger checks in with the specialty agent. The specialty agent interfaces with the club agent functional module 26 and inputs the designated passenger's passenger information. The club agent functional module 26 tracks and monitors the flights associated with the designated passengers that are within the designated guest area and can provide alerts if flights associated with the designated passengers are disrupted.

In an exemplary embodiment, the SOC functional module 28 alerts system operations control (SOC) about potential flight delays due to late arriving resources (such as crew or aircraft). In an exemplary embodiment, the SOC functional module 28 provides a view of flight operations, projected departure times, passenger connections, and air traffic control data. In an exemplary embodiment, the SOC functional module 28 provides recommended actions to mitigate delays that are detected in the system. In an exemplary embodiment, the SOC functional module 28 has a user interface that displays information about inbound crews, inbound flights, aircraft, and outbound flights, and that receives inputs from a user about the crews, flights, and aircraft.

In an exemplary embodiment, the flight cancellation functional module 30 provides functionality to assist the SOC in determining the flights to cancel during off schedule operations. The flight cancellation functional module 30 analyzes operational constraints while minimizing the disruption to passengers, crews, and aircraft maintenance. In an exemplary embodiment, the flight cancellation functional module 30 has a user interface that displays information about a planned cancellation, including information about crews disrupted, the number of passengers disrupted, the number of passengers disrupted with an alternative connection, information about markets affected by the disruptions, and information about gates affected by the disruptions.

In an exemplary embodiment, the air traffic controller functional module 32 manages slots for air traffic control delay programs. The air traffic controller functional module 32 analyzes and projects delays to detect crew curfew and potential passenger disruption problems. The air traffic controller functional module 32 also redistributes delays to minimize the impact on operations and passengers. In an exemplary embodiment, the air traffic controller functional module 32 has a user interface that displays a summary of the impact that slot management will have on passengers and crew, inbound flight and slot details, outbound flight details, and that receives inputs from a user about modifying air traffic control slots.

In an exemplary embodiment, the airplane crew functional module 34 automates the repair of broken crew pairings and minimizes uncovered flights and standby reserve crews while observing governmental and contractual work rules. In an exemplary embodiment, the crew functional module 34 has a user interface that displays the crew members included in a recovery package, the original sequence of a crew member, and the new sequence for the crew member. In several exemplary embodiments, the crew functional module 34 includes one or more features, aspects, components, and/or systems disclosed in U.S. patent application Ser. No. 11/726,946, filed on Mar. 23, 2007, the disclosure of which is incorporated herein by reference.

The engine 12 is capable of producing three types of forecasting: (i) projected times, (ii) probable times, and (iii) postable times. Projected times are forecasted times based on resource dependencies and take into account that no actions will be taken to reduce or adjust delays. One of the uses of the projected times forecast is the ability to detect potential problems early (such as legality and curfew issues). Probable times are based on the projected times and take into account that actions will be taken to reduce or adjust delays. One of the uses of the probable times is pre-planning and prioritization. Postable times are based on probable times and take into account variability in the forecast. One of the uses of the postable times is to publish estimated times of departures to passengers.

Figure 2:
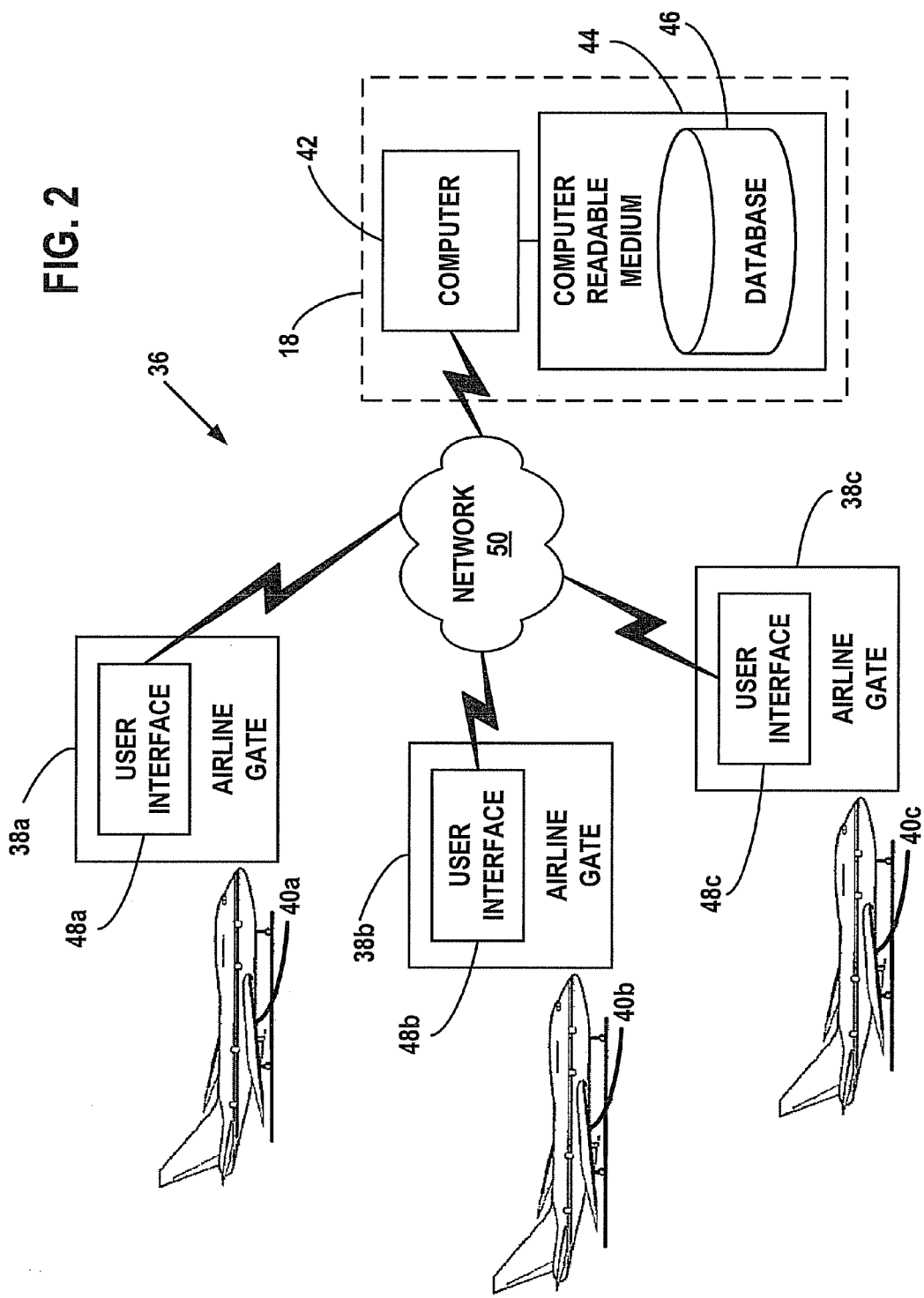
FIG. 2 is a diagrammatic illustration of a system according to an exemplary embodiment, the system including the gate agent functional module of FIG. 1, a plurality of airline gates, and a plurality of remote user interfaces, according to respective exemplary embodiments.

In an exemplary embodiment, as illustrated in FIG. 2 with continuing reference to FIG. 1, a system is generally referred to by the reference numeral 36 and includes airline gates 38a, 38b and 38c, at which airplanes 40a, 40b and 40c, respectively, are configured to stop and/or push off or otherwise depart from. The gates 38a, 38b and 38c are part of an airport, or station (not shown), at which the airplanes 40a, 40b and 40c arrive and from which the airplanes 40a, 40b and 40c depart. The system 36 further includes the gate agent functional module 18 of the system 10, the module 18 including a computer 42 and a computer readable medium 44 operably coupled thereto. Instructions accessible to, and executable by, the computer 42 are stored in the computer readable medium 44. A database 46 is also stored in the computer readable medium 44. Remote user interfaces 48a, 48b and 48c are located at the gates 38a, 38b and 38c, respectively, and are operably coupled to, and in two-way communication with, the computer 42 of the module 18 via a network 50.

In an exemplary embodiment, the module 18 is part of the engine 12. In an exemplary embodiment, one or more components of the module 18, including the computer 42, the computer readable medium 44, content stored in the computer readable medium 44, the database 46, content stored in the database 46, and/or any combination thereof, are part of the engine 12. In an exemplary embodiment, the module 18 and/or one or more components thereof are part of, and/or are distributed throughout, the system 10 and/or one or more of the components thereof, including one or more of the engine 12, and the modules 14, 16, 20, 22, 24, 26, 28, 30, 32 and 34. In an exemplary embodiment, the computer readable medium 44 and/or content stored therein are part of, and/or are distributed throughout, the system 10 and/or one or more of the components thereof, including one or more of the engine 12, and the modules 14, 16, 20, 22, 24, 26, 28, 30, 32 and 34. In an exemplary embodiment, the database 46 and/or the contents stored therein are part of, and/or are distributed throughout, the system 10 and/or one or more of the components thereof, including one or more of the engine 12, and the modules 14, 16, 20, 22, 24, 26, 28, 30, 32 and 34.

In an exemplary embodiment, the module 18 is, includes, or is at least a part of, a web-based program, an Intranet-based program, and/or any combination thereof.

In an exemplary embodiment, the module 18 and/or one or more components thereof are part of, and/or are distributed throughout, the system 36 and/or one or more of the components thereof, including one or more of the user interfaces 48a, 48b and 48c. In an exemplary embodiment, the computer readable medium 44 and/or content stored therein are part of and/or are distributed throughout, the system 36 and/or one or more of the components thereof, including one or more of the user interfaces 48a, 48b and 48c. In an exemplary embodiment, the database 46 and/or content stored therein are part of, and/or are distributed throughout, the system 36 and/or one or more of the components thereof, including one or more of the user interfaces 48a, 48b and 48c. In an exemplary embodiment, the network 50 includes the Internet, one or more local area networks, one or more wide area networks, one or more wireless networks, one or more voice networks, one or more data networks, and/or any combination thereof.

In several exemplary embodiments, the respective quantities of one or more of the components and/or parts of the system 36, such as, for example, the respective quantities of the module 18, the computer 42, the computer readable medium 44, the database 46, the user the user interfaces 48, the airline gates 38, the airplanes 40, are increased, decreased or otherwise varied.

Figure 3:
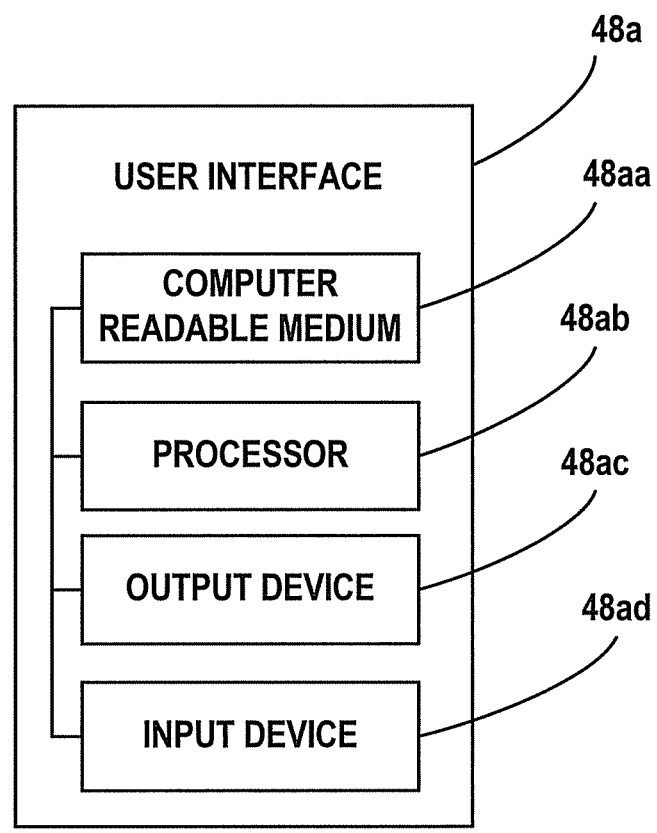
FIG. 3 is a diagrammatic illustration of one of the remote user interfaces of FIG. 2, according to an exemplary embodiment.

In an exemplary embodiment, as illustrated in FIG. 3 with continuing reference to FIGS. 1 and 2, the user interface 48*a* includes a computer readable medium 48*aa*, a processor 48*ab*, an output device 48*ac*, and an input device 48*ad*. In an exemplary embodiment, instructions accessible to, and executable by, the processor 48*ab* are stored in the computer readable medium 48*aa*. In an exemplary embodiment, web browser software is stored in the computer readable medium 48*aa*. In an exemplary embodiment, the output device 48*ac* includes a graphical display, which, in several exemplary embodiments, is in the form of, or includes, one or more digital displays, one or more liquid crystal displays, one or more cathode ray tube monitors, and/or any combination thereof. In an exemplary embodiment, the output device 48*ac* includes a graphical display, a printer, a plotter, and/or any combination thereof. In an exemplary embodiment, the input device 48*ad* includes a touch screen, which, in several exemplary embodiments, is, includes, or is at least a part of, the output device 48*ac*. In an exemplary embodiment, instead of, or in addition to a touch screen, the input device 48*ad* includes one or more keyboards, one or more pin pads, one or more scanners, one or more card readers, and/or any combination thereof.

As noted above, in an exemplary embodiment, the user interface 48*a* is located at the airline gate 38*a*. In an exemplary embodiment, the user interface 48*a* is located at the customer service counter (not shown in the figures) at the airline gate 38*a*. In an exemplary embodiment, the user interface 48*a* is a computing terminal located at the customer service counter at the airline gate 38*a*. In an exemplary embodiment, the user interface 48*a* is a handheld or otherwise portable computing device which is carried by one or more airline gate agents. In an exemplary embodiment, the user interface 48*a* is, includes, or is at least a part of, the module 18, the computer 42, the computer readable medium 44, the database 46, and/or any combination thereof. In several exemplary embodiments, the user interface 48*a* is a thin client and the computer 42 controls at least a portion of the operation of the user interface 48*a*. In several exemplary embodiments, the user interface 48*a* is a thick client. In several exemplary embodiments, the user interface 48*a* functions as both a thin client and a thick client. In several exemplary embodiments, the user interface 48*a* is, or includes, a telephone, a personal computer, a personal digital assistant, a cellular telephone, other types of telecommunications devices, other types of computing devices, and/or any combination thereof. In several exemplary embodiments, the user interface 48*a* includes a plurality of user interfaces. In several exemplary embodiments, the user interface 48*a* is, or at least includes, the module 18. In several exemplary embodiments, the user interface 48*a* is, or at least includes, one or more of the computer 42, the computer readable medium 44, the database 46, one or more of the user interfaces 48*b* and 48*c*, and/or any combination thereof.

In an exemplary embodiment, each of the user interfaces 48*b* and 48*c* is substantially identical to the user interface 48*a* and therefore will not be described in detail. In several exemplary embodiments, the platforms of the computer 14 and the user interfaces 48*a*, 48*b* and 48*c* are identical. In several exemplary embodiments, the platforms of the computer 14 and the user interfaces 48*a*, 48*b* and 48*c* are different. In several exemplary embodiments, the platforms of the computer 14 and the user interfaces 48*a*, 48*b* and 48*c* vary with respect to equipment, peripherals, hardware architecture and/or specifications, software architecture and/or specifications, and/or any combination thereof.

Figure 4:
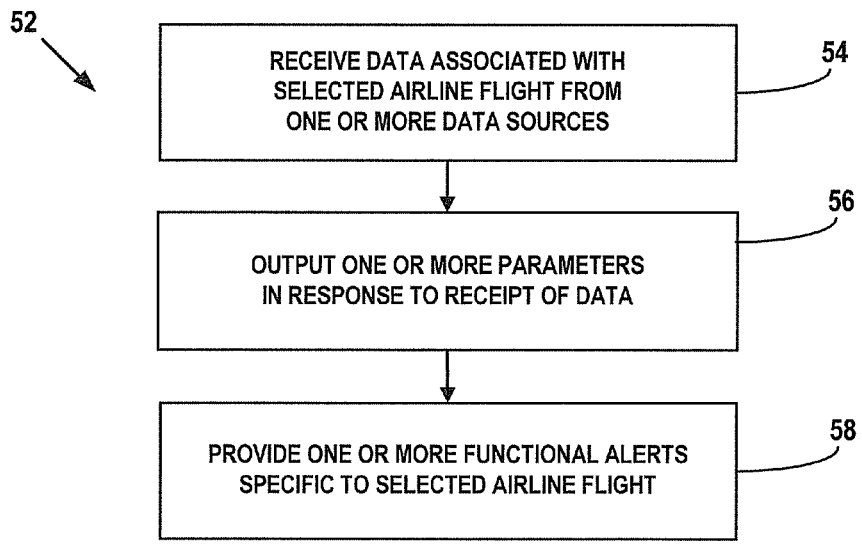
FIG. 4 is a flow chart illustration of a method of operating the system of FIG. 2, according to an exemplary embodiment, the method including receiving data, outputting one or more parameters, and providing one or more functional alerts, according to respective exemplary embodiments.

In an exemplary embodiment, as illustrated in FIG. 4 with continuing reference to FIGS. 1-3, a method of operating the system 36 is generally referred to by the reference numeral 52 and, in several exemplary embodiments, the method 52 is implemented by, or at least partially implemented by, the module 18 of the system 10, the engine 12 of the system 10, the user interfaces 48*a*, 48*b* and 48*c*, and/or any combination thereof. For the purpose of clarity, the method 52 will be described with respect to the airline gate 38*a*. The execution of the method 52 with respect to either the airline gate 38*b* or the airline gate 38*c* is substantially similar to the execution of the method 52 with respect to the airline gate 38*a*.

As shown in FIG. 4, the method 52 includes receiving data associated with a transaction such as an airline flight from one or more data sources in step 54, outputting parameters in response to the receipt of data in step 56, and providing one or more functional alerts specific to the airline flight in step 58.

Figure 5:
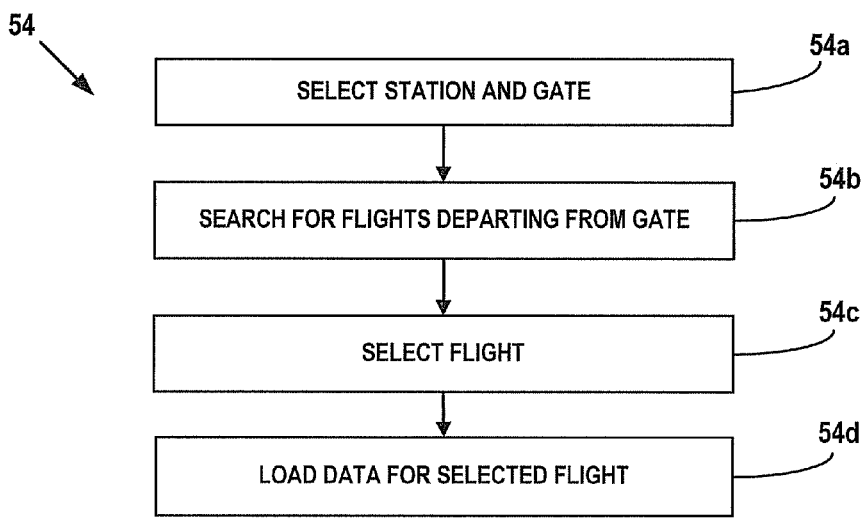
FIG. 5 is a flow chart illustration of the step of receiving data of the method of FIG. 4, according to an exemplary embodiment.

In an exemplary embodiment, as illustrated in FIG. 5 with continuing reference to FIGS. 1-4, the step 54 includes selecting or otherwise inputting both the station at which the gate 38*a* is located and the gate 38*a* itself in step 54*a*, searching for flights that have departed from, and that will depart from, the gate 38*a* in step 54*b*, selecting an airline flight from the search results in step 54*c*, with the airline flight selected in the step 54*c* being hereinafter referred to as "the selected flight," and loading data for the selected flight in step 54*d*. In an exemplary embodiment, to execute the step 54 and/or one or more of the steps 54*a*, 54*b*, 54*c* and 54*d*, a program such as, for example, a web browser, is executed by the processor 48*ab* of the user interface 48*a*, thereby causing the web browser to access a website hosted by the computer 42, which website provides access to one or more programs and data stored in one or more of the computer readable medium 44, the database 46, and the engine 12.

Figure 6:
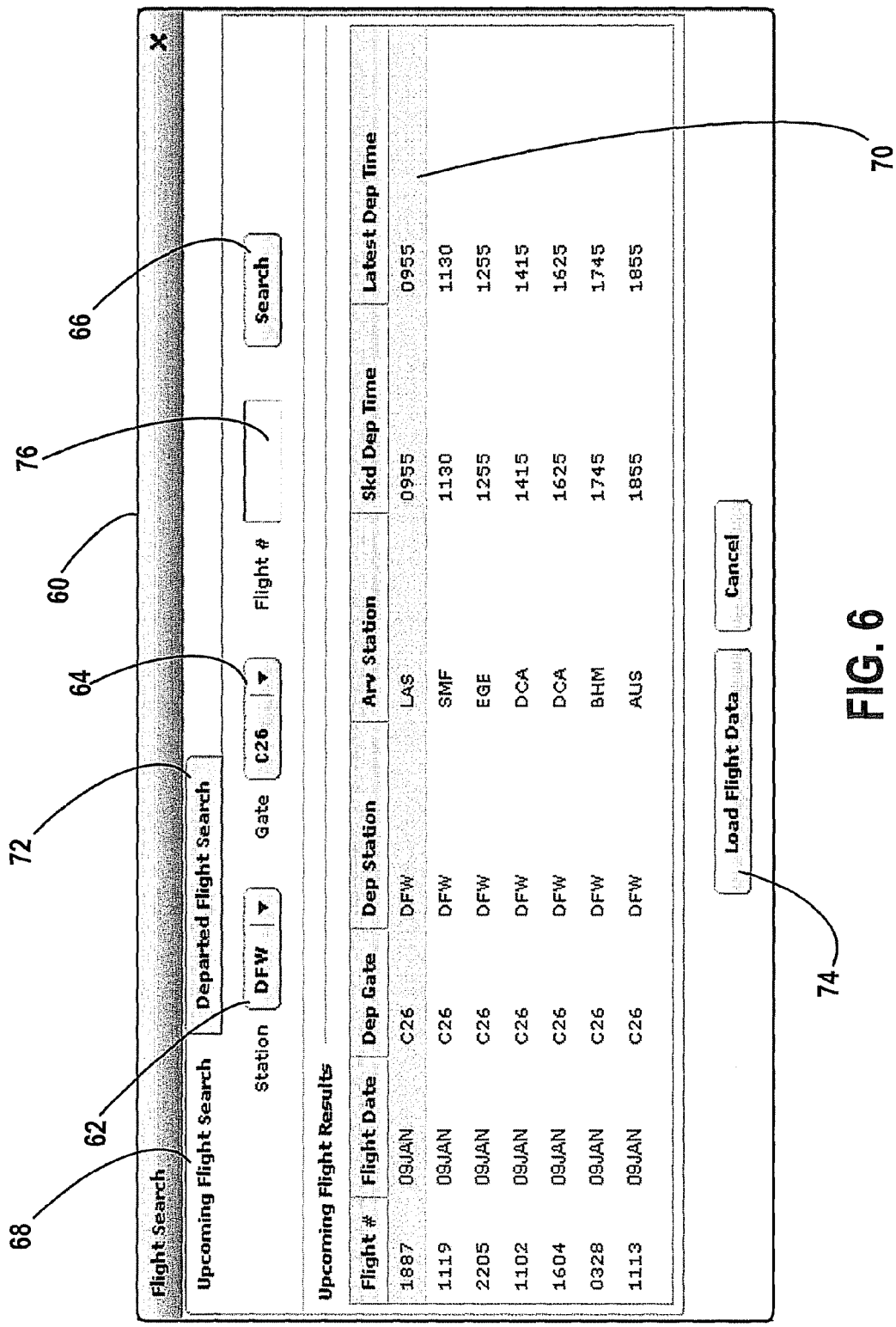
FIG. 6 is a diagrammatic illustration of output generated during the step of FIG. 5, according to an exemplary embodiment.

In an exemplary embodiment, as illustrated in FIG. 6 with continuing reference to FIGS. 1-5, to select or otherwise input both the station at which the gate 38*a* is located and the gate 38*a* itself in the step 54*a*, a dialog box 60 is displayed on the output device 48*ac* of the user interface 48*a*, a select station drop down menu 62 is clicked and/or otherwise selected with the input device 48*ad*, the station at which the gate 38*a* is located is selected from the menu 62, a select gate drop down menu 64 is clicked and/or otherwise selected with the input device 48*ad*, and the gate number of the gate 38*a* is selected from the menu 64. To search in the step 54*b* for flights that have departed from, and that will depart from, the gate selected in the step 54*a*, i.e., the gate 38*a*, a search button 66 is clicked and/or otherwise selected with the input device 48*ad* and, in response, a query is issued for all flights departing from, and that will depart from, the gate 38*a*. To select a flight that will depart from the gate 38*a* in the step 54*c* from the results of the search in the step 54*b*, the flights that will depart from the gate 38*a* are displayed in the dialog box 60 under a tab 68 and a flight is selected by clicking and/or otherwise selecting a row of one or more parameters 70 corresponding therewith. Alternatively, to select a flight that has departed from the gate 38*a* in the step 54*c* from the results of the search in the step 54*b*, the flights that have departed from the gate 38*a* are displayed in the dialog box 60 under a tab 72 and a flight (not shown) is selected by clicking and/or otherwise selecting such flight or displayed parameters (not shown) corresponding therewith. To load data for the selected flight in the step 54*d*, a load flight data button 74 is clicked and/or otherwise selected with the input device 48*ad* and, as a result, data associated with the flight selected in the step 54*c*, is accessed and/or loaded. In an exemplary embodiment, the dialog box 60 automatically closes after the data has been successfully accessed and/or loaded in the step 54*d*. In an exemplary embodiment, the step 54*a* is omitted in favor of inputting a flight number in a flight number box 76 in the dialog box 60 and then executing the steps 54*b*, 54*c* and 54*d*; in an exemplary embodiment, if a flight number is inputted in the flight number box 76, then only the flight corresponding to the inputted flight number is displayed in the dialog box 60 in response to clicking and/or otherwise selecting the search button 66.

In an exemplary embodiment, to receive data associated with the selected flight from one or more data sources in the step 54, to select or otherwise input the station and the gate 38*a* in the step 54*a*, to search for flights in the step 54*b*, to select the flight in the step 54*c*, to load the data for the selected flight in the step 54*d*, and/or to execute any combination thereof, the module 18 receives and stores data in the database 46, with the data being received from one or more of the following data sources: the engine 12 of the system 10; one or more of the modules 14, 16, 20, 22, 24, 26, 28, 30, 32 and 34 of the system 10; one or more of the airplanes 40*a*, 40*b* and 40*c*; one or more of the remote user interfaces 38*a*, 38*b* and 38*c*; a dispatch environmental control system (DECS) (not shown) and/or one or more computer systems, host-based systems and/or applications thereof; an enhanced reservation system (RES) (not shown) and/or one or more computer systems, host-based systems and/or applications thereof; the Federal Aviation Administration (FAA) (not shown) and/or one or more computer systems, host-based systems and/or applications thereof; off-schedule operations (OSO) (not shown) and/or one or more computer systems, host-based systems and/or applications thereof; the station at which the gate 38*a* is located; one or more other stations (not shown); a flight operating system (FOS) (not shown) and/or one or more computer systems, host-based systems and/or applications thereof; and an aircraft communication addressing and reporting system (ACARS) (not shown) and/or one or more computer systems, host-based systems and/or applications thereof. In an exemplary embodiment, to receive data from one or more data sources in the step 54, data is accessed and/or received from the engine 12, but is not stored in the database 46. In an exemplary embodiment, to receive data from one or more data sources in the step 54, to select the station and the gate 38*a* in the step 54*a*, to search for flights in the step 54*b*, to select the flight in the step 54*c*, to load data for the selected flight in the step 54*d*, and/or any combination thereof, the module 18 accesses and/or receives data from the engine 12, the RES (not shown) and/or one or more computer systems, host-based systems and/or applications thereof, the DECS (not shown) and/or one or more computer systems, host-based systems and/or applications thereof, and/or any combination thereof. In an exemplary embodiment, to receive data from one or more data sources in the step 54, to select the station and the gate 38*a* in the step 54*a*, to search for flights in the step 54*b*, to select the flight in the step 54*c*, to load data for the selected flight in the step 54*d*, and/or any combination thereof, the module 18 accesses and/or receives data from the engine 12, which, in turn, accesses and/or receives data from one or more of the following data sources: one or more of the modules 14, 16, 18, 20, 22, 24, 26, 28, 30, 32 and 34 of the system 10; one or more of the airplanes 40*a*, 40*b* and 40*c*; one or more of the remote user interfaces 38*a*, 38*b* and 38*c*; the DECS (not shown) and/or one or more computer systems, host-based systems and/or applications thereof; the RES (not shown) and/or one or more computer systems, host-based systems and/or applications thereof; the Federal Aviation Administration (FAA) (not shown) and/or one or more computer systems, host-based systems and/or applications thereof; the OSO (not shown) and/or one or more computer systems, host-based systems and/or applications thereof; the station at which the gate 38*a* is located; one or more other stations (not shown); the FOS (not shown) and/or one or more computer systems, host-based systems and/or applications thereof; and the ACARS (not shown) and/or one or more computer systems, host-based systems and/or applications thereof.

In an exemplary embodiment, during the execution of the method 52 including the steps 54, 56 and 58, the data received in the step 54 is continually updated, continually updated at predetermined time intervals such as, for example, every 45 seconds, and/or any combination thereof, thereby ensuring that the data received in the step 54 remains current and accurate. In an exemplary embodiment, the step 54 further includes refreshing the received data with recent updates of the data from the aforementioned one or more data sources, issuing one or more queries for updated data from the one or more data sources, issuing one or more queries for updated data from the one or more data sources at predetermined time intervals such as, for example, every 45 seconds, issuing one or more queries for all of the data previously received in the step 54, issuing one or more queries for all of the data previously received in the step 54 at predetermined time intervals such as, for example, every 45 seconds, and/or any combination thereof.

Figure 7:
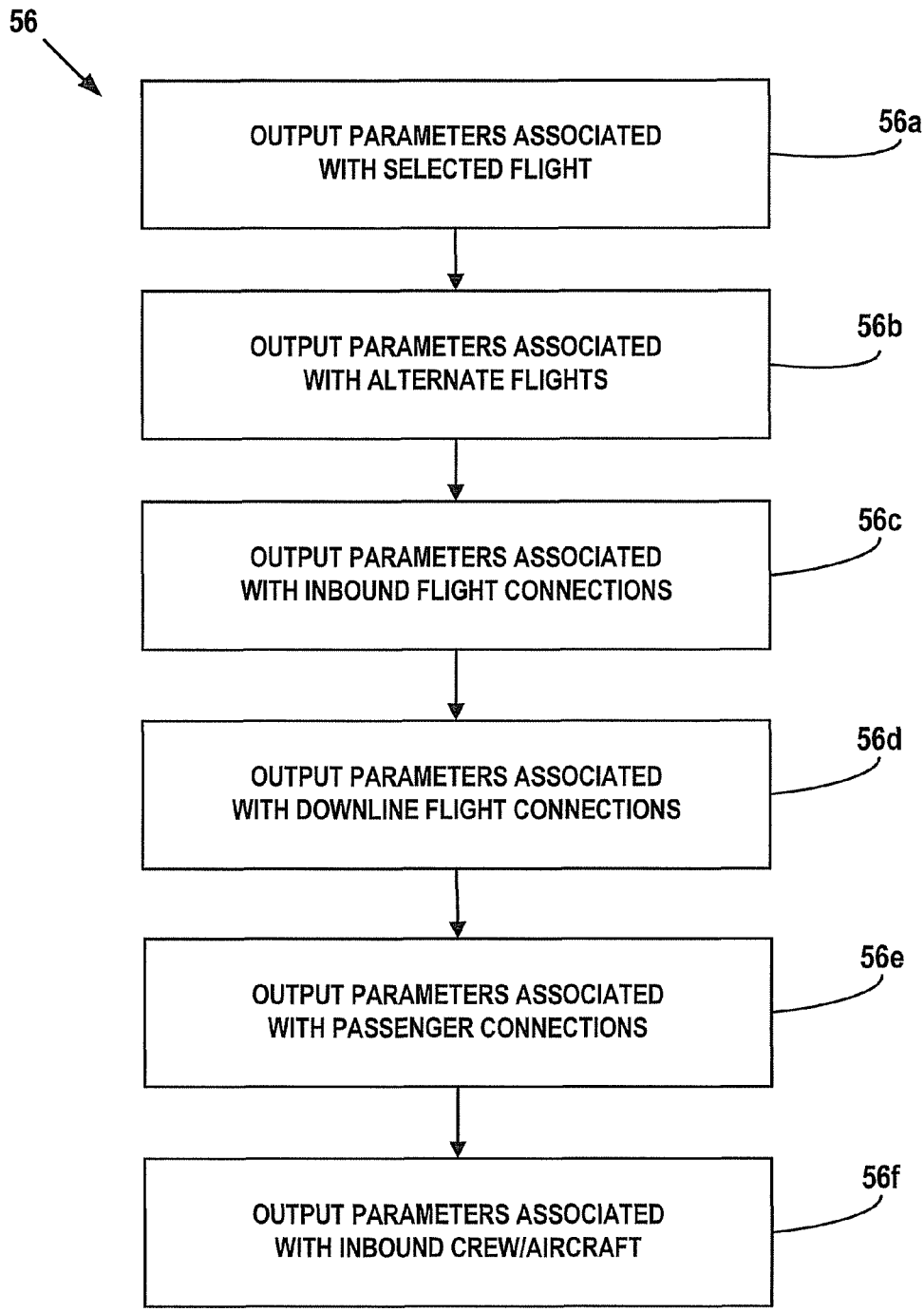
FIG. 7 is a flow chart illustration of the step of outputting one or more parameters of the method of FIG. 4, according to an exemplary embodiment.

In an exemplary embodiment, as illustrated in FIG. 7 with continuing reference to FIGS. 1-6, the step 56 includes outputting parameters associated with the selected flight in step 56*a*, outputting parameters associated with alternate flights in step 56*b*, outputting parameters associated with inbound flight connections in step 56*c*, outputting parameters associated with downline flight connections in step 56*d*, outputting parameters associated with passenger connections in step 56*e*, and outputting parameters associated with inbound crew/aircraft in step 56*f*.

In an exemplary embodiment, as illustrated in FIG. 8 with continuing reference to FIGS. 1-7, to output parameters associated with the selected flight in the step 56*a*, a group 78 of data parameter fields is displayed on the output device 48*ac*, the group 78 including a flight number data parameter field indicating the flight number of the selected flight, a departure location data parameter field indicating the departure location of the selected flight which is the station or airport at which the airline gate 38*a* is located, an arrival location data parameter field indicating the arrival location of the selected flight, a departure gate number data parameter field indicating the gate number of the airline gate 38*a*, a scheduled departure time data parameter field indicating the scheduled departure time of the selected flight, an estimated time of departure data parameter field indicating the estimated time of departure of the selected flight, a flight plan data parameter field indicating whether the flight plan is over or under and by how long the flight plan is over or under, an arrival gate data parameter field indicating the gate number of the arrival gate of the selected flight, an availability data parameter field indicating how long the gate 38*a* is available, an estimated time of arrival data parameter field indicating the estimated time of arrival of the selected flight, and a flying time data parameter field indicating the estimated flying time of the selected flight. The group 78 further includes a group 78*a* of inbound aircraft data parameter fields regarding the airplane 40*a*, the group 78*a* including a flight number data parameter field indicating the flight number under which the airplane 40*a* arrived at the airline gate 38*a*, a departure location data parameter field indicating the departure location of the airplane 40*a* before it arrived at the airline gate 38*a*, a status data parameter field indicating the status of the airplane 40*a*, and an estimated arrival time data parameter field indicating the time at which the airplane 40*a* is estimated to arrive at the station at which the airline gate 38*a* is located. The group 78 still further includes a group 78*b* of inbound cockpit crew data parameter fields including a flight number data parameter field indicating the flight number under which the inbound cockpit crew arrived at the station at which the airline gate 38*a* is located, a departure location data parameter field indicating the departure location of the inbound cockpit crew before the crew arrived at the station at which the airline gate 38*a* is located, a status data parameter field indicating the status of the inbound cockpit crew, and an estimated arrival time data parameter field indicating the time at which the inbound cockpit crew is estimated to arrive at the station at which the gate 38*a* is located. The group 78 yet still further includes a group 78*c* of inbound flight attendant crew data parameter fields including a flight number data parameter field indicating the flight number under which the inbound flight attendant crew arrived at the station at which the airline gate 38*a* is located, a departure location data parameter field indicating the departure location of the inbound cockpit crew before the crew arrived at the station at which the airline gate 38*a* is located, a status data parameter field indicating the status of the inbound flight attendant crew, and an estimated arrival time data parameter field indicating the time at which the inbound flight attendant crew is estimated to arrive at the station at which the gate 38*a* is located. In an exemplary embodiment, a symbol such as, for example, an asterisk (*) is displayed in the group 78*b* if the members of the inbound cockpit crew are not all arriving on the same flight; if the symbol is displayed, then data associated with the latest flight that a member will arrive on is displayed in the group 78*b*. In an exemplary embodiment, a symbol such as, for example, an asterisk (*) is displayed in the group 78*c* if the members of the inbound flight attendant crew are not all arriving on the same flight; if the symbol is displayed, then data associated with the latest flight that a member will arrive on is displayed in the group 78*c*. In an exemplary embodiment, by displaying the group 78 on the output device 48*ac* in the step 56*a*, critical and/or helpful operational information associated with the selected flight is quickly and easily communicated to a user of the user interface 48*a* such as, for example, the airline gate agent at the gate 38*a*, who, in turn, can quickly and easily communicate the operational information to others such as, for example, airline passengers.

In an exemplary embodiment, as illustrated in FIG. 8 with continuing reference to FIGS. 1-7, to output parameters associated with alternate flights in the step 56*b*, one or more rows 80 are displayed on the output device 48*ac*, with each row in the one or more rows 80 including data parameter fields associated with a specific alternate flight having an arrival location which is the same as the arrival location of the selected flight indicated in the group 78. Each row in the one or more rows 80 includes a flight number data parameter field identifying the flight number of a specific alternate flight having an arrival location which is the same as the arrival location of the selected flight, a flight date data parameter field indicating the flight date of the specific alternate flight, a departure location data parameter field indicating the departure location or station of the specific alternate flight which corresponds to the departure location of the selected flight indicated in the group 78, i.e., the airport or station at which the gate 38*a* is located, an arrival location data parameter field indicating the arrival location of the specific alternate flight which corresponds to the arrival location of the selected flight indicated in the group 78, a scheduled departure time data parameter field indicating the scheduled departure time of the specific alternate flight, a latest time of departure data parameter field indicating the latest time of departure of the specific alternate flight, a projected time of departure data parameter field indicating the projected time of departure of the specific alternate flight, a wait time data parameter field indicating the amount of wait time before the specific alternate flight is projected to depart, and an available seats data parameter field indicating the quantity of available seats on the specific alternate flight. In an exemplary embodiment, the step 56*b* greatly facilitates the rerouting and/or rebooking of customers who were originally scheduled to depart on the selected flight indicated in the group 78.

In an exemplary embodiment, the one or more rows 80 are displayed on the output device 48*ac* in the step 56*b* before, during or after the display of the group 78 on the output device 48*ac* in the step 56*a*.

In an exemplary embodiment, the dialog box 60 shown in FIG. 6 is initially displayed on the output device 48*ac* in response to the initial operation of the module 18 with the user interface 48*a*, the initial execution of the step 54 with the user interface 48*a*, the initial execution of the method 52 with the user interface 48*a*, and/or any combination thereof. In an exemplary embodiment, subsequent operations of the module 18 with the user interface 48*a*, subsequent executions of the step 54 with the user interface 48*a*, subsequent executions of the method 52 with the user interface 48*a*, and/or any combination thereof, will cause the output shown in FIG. 8 to default to the last gate selected, i.e., the gate 38*a*; after the selected flight departs from the gate 38*a*, i.e., after the airplane 40*a* departs from the gate 38*a*, the output shown in FIG. 8 will reflect an automatic loading or selection of the next flight out of the gate 38*a*.

In an exemplary embodiment, as shown in FIG. 8, to repeat one or more of the steps 54, 54*a*, 54*b*, 54*c* and 54*d* before, during or after one or more of the steps 56 and 58, a flight search button 81 is clicked and/or otherwise selected, thereby opening the dialog box 60 shown in FIG. 6.

In an exemplary embodiment, as illustrated in FIG. 9 with continuing reference to FIGS. 1-8, to output parameters associated with inbound flight connections in the step 56*c*, one or more rows 82 are displayed on the output device 48*ac*, with each row in the one or more rows 82 including data parameter fields associated with an inbound flight having one or more passengers who are scheduled to connect to the selected flight and thus are scheduled to depart from the gate 38*a* on the airplane 40*a*. Each row in the one or more rows 82 includes a passenger quantity data parameter field indicating the quantity of passengers on the inbound flight who are scheduled to connect to the selected flight and thus are scheduled to depart from the gate 38*a* on the airplane 40*a*, a bags quantity data parameter field indicating the total quantity of bags to be transferred from the inbound flight to the airplane 40*a*, a flight number data parameter field indicating the flight number of the inbound flight, a flight origin data parameter field indicating the departure location or flight origin of the inbound flight, an arrival gate indicating the gate number at which the inbound flight will stop or has stopped, a connection time data parameter field indicating the amount of time remaining for the passengers on the inbound flight to connect to the selected flight at the gate 38*a*, an estimated time of arrival data parameter field indicating the estimated time of arrival or the time of arrival of the inbound flight, and a status data parameter field indicating the status of the inbound flight such as, for example, a status of ETA if the inbound flight is still in the air, a status of ON if the inbound flight has landed at the airport or station at which the gate 38a is located, a status of IN if the inbound flight has stopped at its arrival gate, and a status of CHO if the inbound flight is still in the air but on approach to the station at which the gate 38a is located.

In an exemplary embodiment, the rows in the one or more rows 82 are sorted by the amount of connection time, with the top row in the one or more rows 82 corresponding to the inbound flight with passengers having the least amount of time to connect to the selected flight at the gate 38a. In an exemplary embodiment, if the connection time data parameter field in one of the rows 82 indicates that the connection time is less than 30 minutes, then the row 82 will be emphasized by, for example, being highlighted in yellow. In an exemplary embodiment, if the connection time data parameter field in one of the rows 82 indicates that the connection time is less than 15 minutes, then the row 82 will be further emphasized by, for example, being highlighted in red. In an exemplary embodiment, the step 56c greatly facilitates identifying misconnecting passengers.

In an exemplary embodiment, the one or more rows 82 are displayed on the output device 48ac before, during or after the display of the group 78 on the output device 48ac in the step 56a, the display of the one or more rows 80 on the output device 48ac in the step 56b, and/or any combination thereof.

As shown in FIG. 9, in an exemplary embodiment, the one or more rows 82 are displayed on the output device 48ac in the step 56 in response to clicking or otherwise selecting a symbol such as a tab 84.

In an exemplary embodiment, as illustrated in FIG. 10 with continuing reference to FIGS. 1-9, to output parameters associated with downline flight connections in the step 56d, one or more rows 86 are displayed on the output device 48ac, with each row in the one or more rows 86 including data parameter fields associated with a downline flight scheduled to have one or more passengers on the selected flight departing from the gate 38a on the airplane 40a, i.e., a future flight departing from the arrival location of the selected flight and having one or more passengers on the selected flight. Each row in the one or more rows 86 includes a passenger quantity data parameter field indicating the quantity of passengers on the downline flight who are scheduled to connect from the selected flight and thus are scheduled to depart from the arrival location of the selected flight, a bags quantity data parameter field indicating the total quantity of bags to be transferred from the airplane 40a to the downline flight, a flight number data parameter field indicating the flight number of the downline flight, a departure station data parameter field indicating the departure location or flight origin of the downline flight which is the arrival location of the selected flight, an arrival station indicating the arrival location of the downline flight, a scheduled departure data parameter field indicating the scheduled departure time of the downline flight, an estimated time of departure data parameter field indicating the current estimated time of departure of the downline flight, a departure gate data parameter field indicating the gate number of the departure gate from which the downline flight is scheduled to depart, and a connection time data parameter field indicating the amount of time for the passengers on the selected flight to connect to the downline flight.

In an exemplary embodiment, the rows in the one or more rows 86 are sorted by the amount of connection time, with the top row in the one or more rows 86 corresponding to the downline flight with passengers having the least amount of time to connect from the selected flight to the downline flight. In an exemplary embodiment, if the connection time data parameter field in one of the rows 86 indicates that the connection time is less than 30 minutes, then the row 86 will be emphasized by, for example, being highlighted in yellow. In an exemplary embodiment, if the connection time data parameter field in one of the rows 86 indicates that the connection time is less than 15 minutes, then the row 86 will be further emphasized by, for example, being highlighted in red.

In an exemplary embodiment, the one or more rows 86 are displayed on the output device 48ac before, during or after the display of the group 78 on the output device 48ac in the step 56a, the display of the one or more rows 80 on the output device 48ac in the step 56b, the display of the one or more rows 82 on the output device 48ac in the step 56c, and/or any combination thereof.

As shown in FIG. 10, in an exemplary embodiment, the one or more rows 86 are displayed on the output device 48ac in the step 56 in response to clicking or otherwise selecting a symbol such as a tab 88.

In an exemplary embodiment, as illustrated in FIG. 11 with continuing reference to FIGS. 1-10, to output parameters associated with passenger connections in the step 56e, one or more rows 90 are displayed on the output device 48ac, with each row in the one or more rows 90 including data parameter fields associated with a connecting flight for one or more passengers scheduled to travel on, who are traveling on, or who have traveled on, the airplane 40a to the airport or station at which the gate 38a is located and who will stop, or have stopped, at the gate 38a while on the airplane 40a, the connecting flight being scheduled to depart from an airline gate at the station or airport at which the gate 38a is located such as, for example, the gate 38b or 38c. Each row in the one or more rows 90 includes a flight number data parameter field indicating the flight number of the connecting flight, a flight date data parameter field indicating the date on which the connecting flight is to depart, a departure station data parameter field indicating the station or airport from which the connecting flight is to depart, i.e., the station or airport at which the gate 38a is located, a departure gate data parameter field indicating the departure gate of the connecting flight, an arrival station data parameter field indicating the arrival station or airport of the connecting flight, a scheduled departure time data parameter field indicating the scheduled departure time of the connecting flight, and a projected departure time indicating the projected departure time of the connecting flight, a latest departure time data parameter filed indicating the latest departure time of the connecting flight.

In an exemplary embodiment, the rows in the one or more rows 86 are sorted by the order of departure, with the top row in the one or more rows 90 corresponding to the connecting flight having the earliest projected departure time. In an exemplary embodiment, the step 56e greatly facilitates providing connection information for passengers arriving at the gate 38a on the airplane 40a prior to the departure of the selected flight from the gate 38a.

In an exemplary embodiment, the one or more rows 90 are displayed on the output device 48ac before, during or after the display of the group 78 on the output device 48ac in the step 56a, the display of the one or more rows 80 on the output device 48ac in the step 56b, the display of the one or more rows 82 on the output device 48ac in the step 56c, the display of the one or more rows 86 on the output device 48ac in the step 56d, and/or any combination thereof.

As shown in FIG. 11, in an exemplary embodiment, the one or more rows 90 are displayed on the output device 48ac in the step 56 in response to clicking or otherwise selecting symbol such as a tab 92.

In an exemplary embodiment, as illustrated in FIG. 12 with continuing reference to FIGS. 1-10, to output parameters associated with inbound crew/aircraft in the step 56*f*, a row 94 is displayed on the output device 48*ac* and includes data parameter fields associated with the inbound flight of the airplane 40*a* before the airplane 40*a* arrives at the gate 38*a* and is used for the selected flight. The row 94 includes a flight number data parameter field indicating the flight number of the inbound flight of the airplane 40*a*, a scheduled arrival time data parameter field indicating the scheduled arrival time of the inbound flight of the airplane 40*a*, an estimated time of arrival data parameter field indicating the estimated or actual time of arrival of the inbound flight of the airplane 40*a*, a status data parameter field indicating the flight status of the inbound flight of the airplane 40*a* such as, for example, a status of ETA if the inbound flight is still in the air, a status of ON if the inbound flight has landed at the airport or station at which the gate 38*a* is located, a status of IN if the inbound flight has stopped at the gate 38*a*, and a status of CHO if the inbound flight is still in the air but on approach to the station at which the gate 38*a* is located, and a passenger count data parameter field indicating the quantity of passengers on the inbound flight of the airplane 40*a*. In addition to displaying the row 94 on the output device 48*ac*, the step 56*f* also includes displaying one or more rows 96 on the output device 48*ac*, with each row in the one or more rows 96 including data parameter fields associated with a specific inbound crewmember scheduled to be a crewmember on the selected flight. Each row in the one or more rows 96 includes a base data parameter field indicating the base location of the specific inbound crewmember, a position data parameter field indicating the position of the specific inbound crewmember, a name data parameter field indicating the name of the specific inbound crewmember, a flight number data parameter field indicating the flight number of the inbound flight on which the specific inbound crewmember will fly, is flying, or has flown, in order to arrive at the airport or station at which the gate 38*a* is located, a flight status data parameter field indicating the flight status of the inbound flight on which the specific inbound crewmember will fly, is flying, or has flown, an estimated time of arrival data parameter field indicating the estimated time of arrival of the inbound flight on which the specific inbound crewmember will fly, is flying, or has flown, and a gate number data parameter field indicating the gate number of the gate at which the inbound flight will arrive or has arrived.

In an exemplary embodiment, the row 94 and/or the one or more rows 96 are displayed on the output device 48*ac* before, during or after the display of the group 78 on the output device 48*ac* in the step 56*a*, the display of the one or more rows 80 on the output device 48*ac* in the step 56*b*, the display of the one or more rows 82 on the output device 48*ac* in the step 56*c*, the display of the one or more rows 86 on the output device 48*ac* in the step 56*d*, the display of the one or more rows 90 on the output device 48*ac* in the step 56*e*, and/or any combination thereof.

As shown in FIG. 12, in an exemplary embodiment, the row 94 and the one or more rows 96 are displayed on the output device 48*ac* in the step 56*f* in response to clicking or otherwise selecting a symbol such as a tab 98.

In an exemplary embodiment, before, during or after the step 54, the step 56, and/or any combination thereof, one or more functional alerts are provided in the step 58 of the method 52, as noted above.

Figure 13:
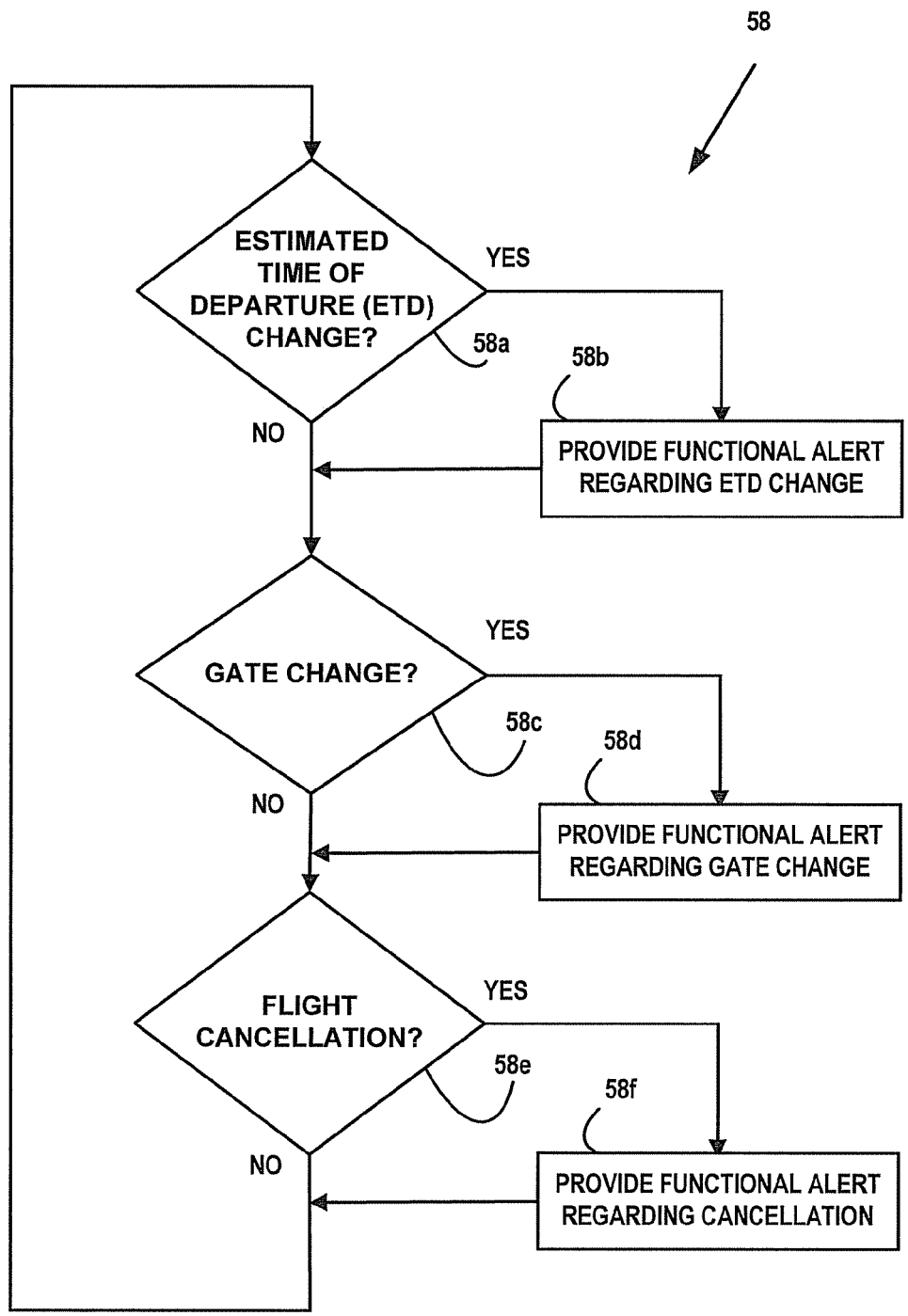
FIG. 13 is a flow chart illustration of the step of providing one or more functional alerts of the method of FIG. 4, according to an exemplary embodiment.

In an exemplary embodiment, as illustrated in FIG. 13 with continuing reference to FIGS. 1-12, to provide one or more functional alerts specific to the selected airline flight in the step 58 of the method 52, it is determined in step 58*a* whether the estimated time of departure of the selected airline flight, which corresponds to the departure of the airplane 40*a* from the gate 38*a*, has changed. If it is determined in the step 58*a* that the estimated time of departure has indeed changed, then a functional alert regarding the change in the estimated time of departure is outputted in step 58*b*. It is determined in step 58*c* whether the gate from which the selected flight is to depart has changed from the gate 38*a* to another gate such as, for example, the gate 38*b* or 38*c*. If so, then a functional alert regarding the gate change is outputted in step 58*d*. It is determined in step 58*e* whether the selected flight has been canceled and, if so, then a functional alert regarding the flight cancellation is outputted in step 58*f*.

In an exemplary embodiment, as illustrated in FIG. 14 with continuing reference to FIGS. 1-13, to provide a functional alert regarding a change in the estimated time of departure in the step 58*b*, a dialog box 100 is displayed on the output device 48*ac*, the dialog box 100 including a message 102 indicating that the estimated time of departure has changed by, for example, displaying the old estimated time of departure and the new estimated time of departure. The dialog box 100 is a pop-up window which is at least partially displayed over, and/or otherwise interrupts, any other application or program being run, displayed and/or otherwise operated with the user interface 48*a*. To close the dialog box 100, an OK button 104 is clicked and/or otherwise selected with the input device 48*ad*, thereby requiring the user of the user interface 48*a* to acknowledge the change in the estimated time of departure.

In several exemplary embodiments, instead of, or in addition to determining whether there has been a change in the estimated time of departure for the selected flight in the step 58*a* and, if so, then outputting a functional alert in the step 58*b*, the step 58*a* includes determining whether there has been a change in the estimated time of departure for one or more other flights such as, for example, one or more flights associated with one or more of the rows 80, 82, 86, 90, 94 and 96, and the step 58*b* includes outputting functional alerts regarding such changes.

Figure 15:
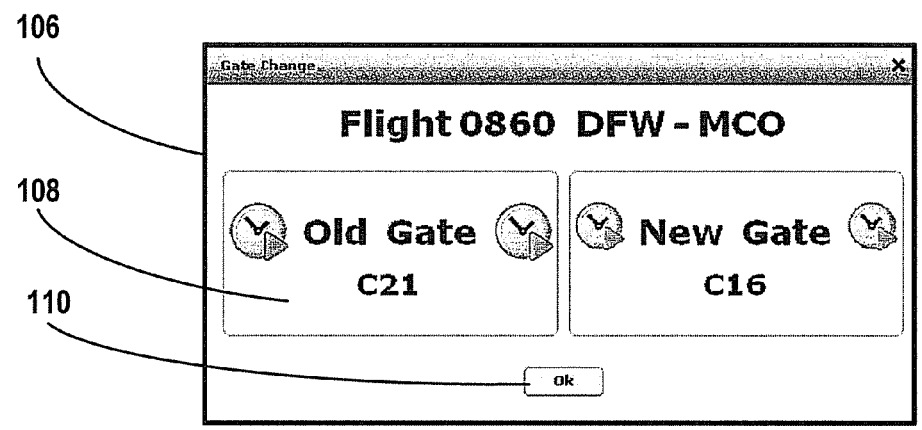

In an exemplary embodiment, as illustrated in FIG. 15 with continuing reference to FIGS. 1-14, to provide a functional alert regarding a gate change in the step 58*d*, a dialog box 106 is displayed on the output device 48*ac*, the dialog box 106 including a message 108 indicating that the departure gate has changed by, for example, displaying the old departure gate and the new departure gate. The dialog box 106 is a pop-up window which is at least partially displayed over, and/or otherwise interrupts, any other application or program being run, displayed and/or otherwise operated with the user interface 48*a*. To close the dialog box 106, an acknowledgment button 110 is clicked and/or otherwise selected with the input device 48*ad*, thereby requiring the user of the user interface 48*a* to acknowledge the gate change.

In several exemplary embodiments, instead of or in addition to determining whether there has been a gate change for the selected flight in the step 58*c* and, if so, then outputting a functional alert in the step 58*d*, the step 58*c* includes determining whether there has been a gate change for one or more other flights such as, for example, one or more flights associated with one or more of the rows 80, 82, 86, 90, 94 and 96, and the step 58*d* includes outputting functional alerts regarding such changes.

Figure 16:

In an exemplary embodiment, as illustrated in FIG. 16 with continuing reference to FIGS. 1-15, to provide a functional alert regarding a flight cancellation in the step 58*f*, a dialog box 112 is displayed on the output device 48*ac*, the dialog box 112 including a message 114 indicating that the selected flight has been canceled. The dialog box 112 is a pop-up window which is at least partially displayed over, and/or otherwise interrupts, any other application or program being run, displayed and/or otherwise operated with the user interface 48a. To close the dialog box 112, an acknowledgment button 116 is clicked and/or otherwise selected with the input device 48ad, thereby requiring the user of the user interface 48a to acknowledge the flight cancellation.

In several exemplary embodiments, instead of, or in addition to determining whether there has been a cancellation of the selected flight in the step 58e and, if so, then outputting a functional alert in the step 58f, the step 58e includes determining whether there has been a cancellation of one or more other flights such as, for example, one or more flights associated with one or more of the rows 80, 82, 86, 90, 94 and 96, and the step 58f includes outputting functional alerts regarding such changes.

In an exemplary embodiment, the steps 58a, 58c and 58e are continuously and simultaneously or nearly simultaneously executed, and the steps 58b, 58d and 58f are continuously and simultaneously executed as necessary.

In an exemplary embodiment, the step 58 provides immediate notification of flight cancellations, delays and gate changes, thereby enabling the user of the user interface 48a such as, for example, the gate agent positioned at the gate 38a, to receive critical operational information just as fast as passengers may receive the same information via cell phones, personal digital assistants, computers, etc.

Figure 17A:
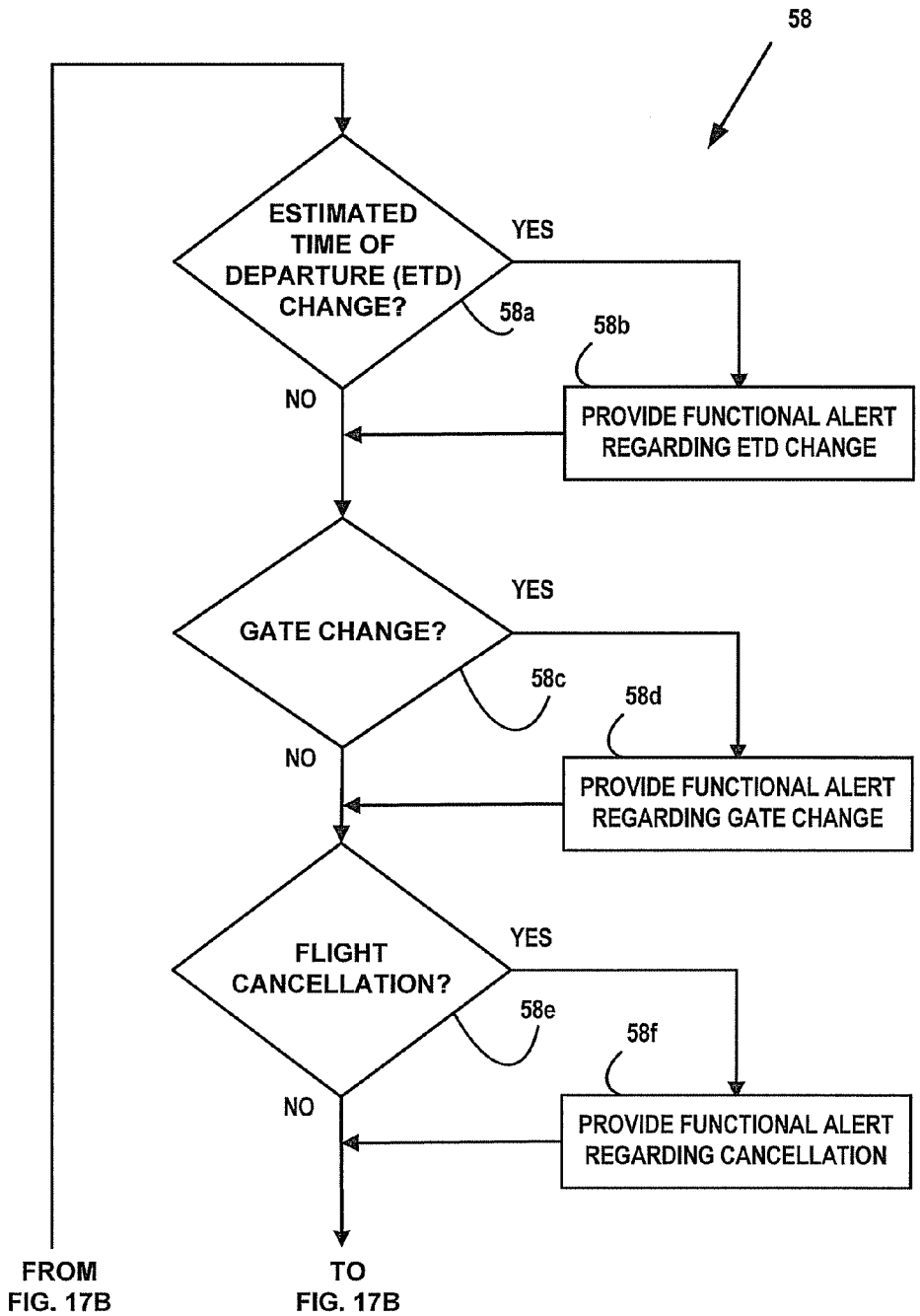
FIGS. 17A, 17B and 17C together form a flow chart illustration of the step of providing one or more functional alerts of the method of FIG. 4, according to another exemplary embodiment.
Figure 17B:
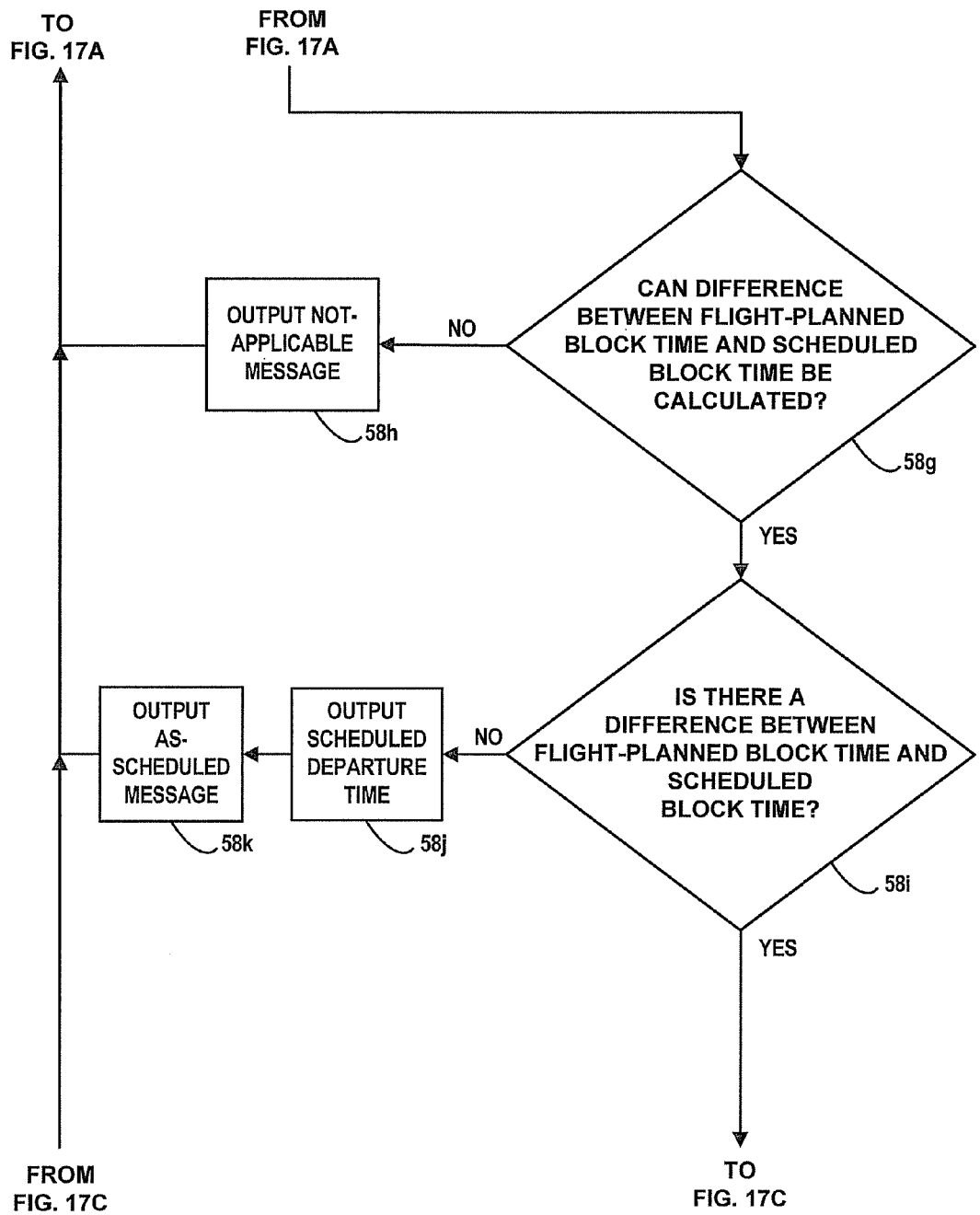
Figure 17C:
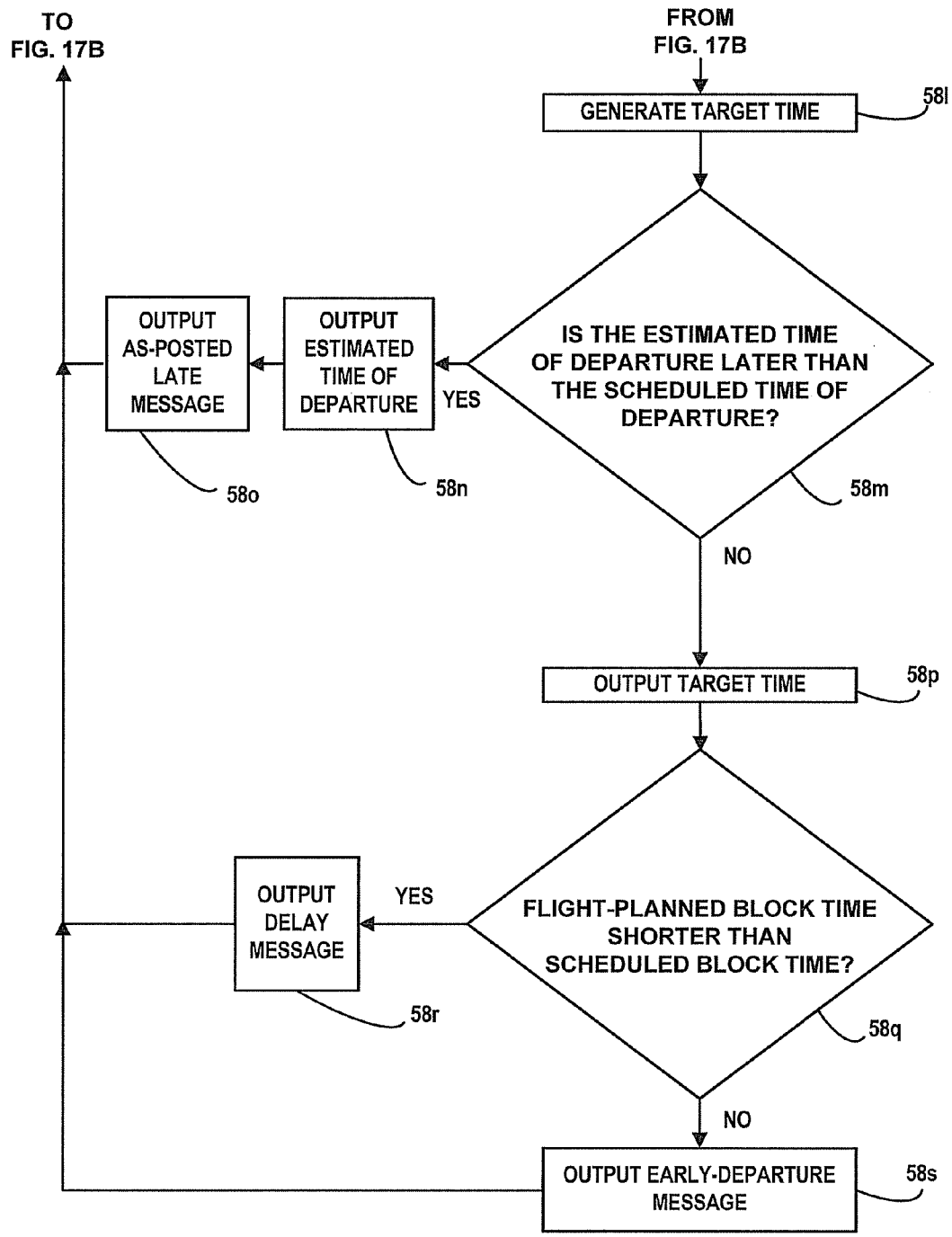

In an exemplary embodiment, as illustrated in FIGS. 17A, 17B and 17C with continuing reference to FIGS. 1-16, in addition to including the steps 58a, 58b, 58c, 58d, 58e and 58f, the step 58 further includes determining whether a difference between the flight-planned block time of the selected flight and the scheduled block time of the selected flight can be calculated in step 58g and, if not, outputting a not-applicable message in step 58h, with the term "block time" referring to the time period that begins with the taxi out of the airplane 40a, includes the flying time of the airplane 40a for the selected flight, and ends with the taxi in of the airplane 40a at the arrival gate for the selected flight. If it is determined in the step 58g that a difference can be calculated, then it is determined in step 58i whether there is a difference between the flight-planned block time of the selected flight and the scheduled block time of the selected flight. If not, then the scheduled departure time is outputted in step 58j and an as-scheduled message is outputted in step 58k. If it is determined in the step 58i that there is a difference between the flight-planned block time of the selected flight and the scheduled block time of the selected flight, then a target time for the selected flight, i.e., a recommended or optional time of departure for the selected flight, is generated in step 58l. It is then determined in the step 58m whether the estimated time of departure is past the scheduled time of departure. If so, then an estimated time of departure for the selected flight is outputted in step 58n and an as-posted late message is outputted in step 58i. If it is determined in the step 58m that the estimated time of departure is not past the scheduled time of departure, then the target time is outputted in step 58p. Further, it is determined in step 58q whether the flight-planned block time is shorter than the schedule block time. If so, then a delay message is outputted in step 58r. If it is determined in the step 58q that the flight-planned block time for the selected flight is not shorter than the scheduled block time for the selected flight, then an early-departure message is outputted in step 58s. In several exemplary embodiments, one or more of the steps 58g, 58i, 58l, 58m and 58q are combined.

In an exemplary embodiment, to determine whether or not a difference between the flight-planned block time and the scheduled block time can be calculated in the step 58g, a check is made to determine if the flight plan has been calculated for this flight or not; if so, then it is determined that the difference between the flight-planned block time and the scheduled block time can be calculated, otherwise it cannot. In an exemplary embodiment, to determine whether a difference between the flight-planned block time and the scheduled block time can be calculated in the step 58g, it is determined whether the difference between the current time and the scheduled time of departure is greater than a predetermined time period such as, for example, 60 minutes; if so, then it is determined that the difference between the flight-planned block time and the scheduled block time cannot be calculated. In an exemplary embodiment, it is determined in the step 58g that the difference cannot be calculated if it is too early in the day or night. In an exemplary embodiment, the step 58g is executed in whole or in part with the engine 12.

In an exemplary embodiment, as illustrated in FIG. 18 with continuing reference to FIGS. 1-17C, to output the not-applicable message in the step 58h, a not-applicable message 118 is displayed on the output device 48ac. As shown in FIG. 18, in an exemplary embodiment, the message 118 includes the term TARGET, an instance of the term N/A indicating that there is not a target time available because any difference between the flight-planned block time and the scheduled block time cannot be calculated, and another instance of the term N/A indicating that, since a target time is not available, there is also no functional alert or recommendation or indication available. As shown in FIG. 18, in an exemplary embodiment, the message 118 is positioned proximate the group 78; in several exemplary embodiments, the message 118 is positioned in one or more other locations, in a pop-up dialog box or window, and/or any combination thereof.

Figure 19A:
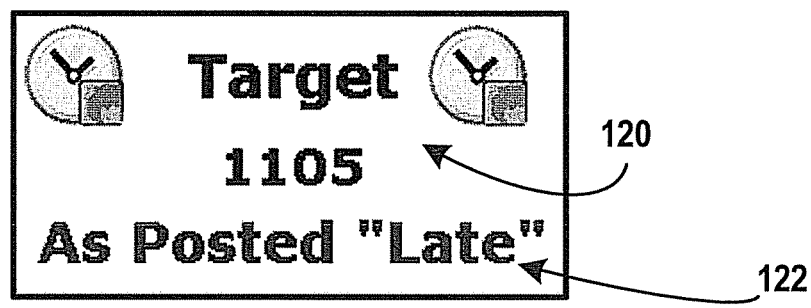

In an exemplary embodiment, as illustrated in FIG. 19A with continuing reference to FIGS. 1-18, to output the estimated time of departure in the step 58n if the estimated time of departure is later than the scheduled departure time of the selected flight, a message 120 is displayed on the output device 48ac, the message 120 including the term TARGET and the estimated time of departure of the selected flight. To output the as-posted late message in the step 58o, a message 122 is displayed on the output device 48ac, the message 122 indicating that the departure of the selected flight is late and including the term AS POSTED "LATE". In an exemplary embodiment, the messages 120 and 122 are positioned proximate the group 78; in several exemplary embodiments, the messages 120 and/or 122 are positioned in one or more other locations, in a pop-up dialog box or window, and/or any combination thereof.

In an exemplary embodiment, as illustrated in FIG. 19B with continuing reference to FIGS. 1-19A, to output the estimated time of departure in the step 58n if the estimated time of departure is later than the scheduled departure time of the selected flight, the message 120 is displayed on the output device 48ac, the message 120 including the term TARGET and the estimated time of departure of the selected flight. To output the as-posted late message in the step 58o, a message 123 is displayed on the output device 48ac, the message 123 including the term POSTED ETD. In an exemplary embodiment, the messages 120 and 123 are positioned proximate the group 78; in several exemplary embodiments, the messages 120 and/or 123 are positioned in one or more other locations, in a pop-up dialog box or window, and/or any combination thereof.

In an exemplary embodiment, as illustrated in FIG. 20 with continuing reference to FIGS. 1-19, to output the scheduled departure time in the step 58j if there is not a difference between the flight-planned block time and the scheduled block time, a message 124 is displayed on the output device 48*ac*, the message 124 including the term TARGET and the scheduled time of departure of the selected flight. To output the as-scheduled message in the step 58*k*, a message 126 is displayed on the output device 48*ac*, the message 126 including the term AS SCHEDULED. As shown in FIG. 20, in an exemplary embodiment, the messages 124 and 126 are positioned proximate the group 78; in several exemplary embodiments, the messages 124 and/or 126 are positioned in one or more other locations, in a pop-up dialog box or window, and/or any combination thereof.

In an exemplary embodiment, as illustrated in FIGS. 21 and 22 with continuing reference to FIGS. 1-20, to generate the target time in the step 58*l* if there is a difference between the flight-planned block time and the scheduled block time, an amount of time, or a hold time, is added the estimated time of departure of the selected flight, which is displayed in the estimated time of departure data parameter field in the group 78, if the flight-planned block time is less than the scheduled block time; such a target time, that is, a target time equaling the estimated time of departure plus a hold time, is included in a message 128 in FIG. 21, along with the term TARGET. In an exemplary embodiment, a hold time is added if the flight-planned block time is less than the scheduled block time by a predetermined amount of time such as, for example, greater than or equal to four (4) minutes. The hold time is equal to a percentage such as, for example, 50%, of the difference between the flight-planned block time and the scheduled block time; however, if the selected flight is terminating at its arrival location, then the hold time is the full difference between the flight-planned block time and the scheduled block time plus another amount of time such as, for example, ten (10) minutes, if additional misconnects can be protected. In several exemplary embodiments, the target time included in the message 128 is determined in view of customers, bags, gates, arrival dependability, resource availability, and downline station ground time. In an exemplary embodiment, the target time is generated in the step 58*l* by adjusting the estimated time of departure by the hold time, with the hold time adjustment being partially dependent upon one or more parameters associated with alternate flights, inbound flight connections, downline flight connections, passenger connections, inbound crew, inbound aircraft, and/or any combination thereof.

Instead of adding a hold time to the estimated time of departure in the step 58*l*, an amount of time, or an early time, is subtracted from the estimated time of departure in the step 58*l* if the flight-planned block time is longer than the scheduled block time; such a target time, that is, a target time equaling the estimated time of departure minus an early time, is included in a message 130 in FIG. 22, along with the term TARGET. In an exemplary embodiment, the early time equals the full difference between the flight-planned and scheduled block times. In an exemplary embodiment, the early time equals the full difference between the flight-planned and scheduled block times up to a maximum amount of time such as, for example, five (5) minutes or ten (10) minutes. In an exemplary embodiment, the determination of the early time allows adequate time for connecting crew and connecting passengers, and ensures that no customer will have less than twenty five (25) minutes to connect to the selected flight. In several exemplary embodiments, the target time included in the message 130 is determined in view of customers, bags, gates, arrival dependability, resource availability, and downline station ground time. In an exemplary embodiment, the target time is generated in the step 58*l* by adjusting the estimated time of departure by the early time, with the early time adjustment being partially dependent upon one or more parameters associated with alternate flights, inbound flight connections, downline flight connections, passenger connections, inbound crew, inbound aircraft, and/or any combination thereof.

As shown in FIG. 21, in an exemplary embodiment, to output a delay message in the step 58*r* if the flight-planned block time is shorter than the scheduled block time, a message 132 is displayed on the output device 48*ac*, the message 132 including the term HOLD and being positioned proximate the message 128 including the term TARGET and the target time including the added hold time, as described above. The messages 128 and/or 132 provide a functional alert to the user of the user interface 48*a* such as, for example, the gate agent at the gate 38*a*, indicating that the selected flight, which is to depart from the gate 38*a* with the airplane 40*a*, can be delayed while still permitting the selected flight to arrive on time; such a delay could then be implemented by the gate agent for one or more reasons such as, for example, connecting late-inbound connecting passengers and/or bags, easing the boarding process, easing the process of loading bags, mail and freight, allowing gate agents and/or flight attendants to focus more attention on meeting customer needs, and reducing the risk that the arrival gate at the arrival location may not be available if the selected flight arrives early. As shown in FIG. 21, in an exemplary embodiment, the messages 128 and 132 are positioned proximate the group 78; in several exemplary embodiments, the messages 128 and/or 132 are positioned in one or more other locations, in a pop-up dialog box or window, and/or any combination thereof.

In an exemplary embodiment, the gate agent at the gate 38*a* can use the indicated delay, which is outputted in the step 58, if the gate agent determines that he or she needs that time for permitting late-connecting passengers and/or bags to board the airplane 40*a*, easing the boarding process, and/or any combination thereof, based on the gate agent's discretion. In an exemplary embodiment, the delay message outputted in the step 58*r* is based on flight plan data and current operating conditions at, for example, the gate 38*a*. In an exemplary embodiment, the messages 128 and/or 132 are not published or communicated externally, but are used for internal decision making only, with the gate agent at the gate 38*a* making the decision to meet the target time based on his or her own discretion, without approval from management or operations. In an exemplary embodiment, during the step 58, and in accordance with the foregoing, the gate agent at the gate 38*a* is alerted to the possibility of taking advantage of the flight-planned block time being shorter than the scheduled block time to improve customer service; the departure of the selected flight from the gate 38*a* with the airplane 40*a* can be held or delayed to reduce misconnects and improve the boarding process. In several exemplary embodiments, if the delay indicated in the step 58*r* is implemented by, for example, the gate agent at the gate 38*a*, customer service may be improved by allowing more flexibility to care for customers' needs, holding for connecting passengers and/or bags, and easing the boarding process; moreover, the gate agent is cautioned against departing on time, only to arrive early at the arrival location or downline station and burn fuel, and waste time, waiting for the assigned arrival gate to become available.

As shown in FIG. 22, in an exemplary embodiment, to output an early-departure message in the step 58*s* if the flight-planned block time is longer than the scheduled block time, a message 134 is displayed on the output device 48*ac*, the message 134 including the term EARLY and being positioned proximate the message 130 including the term TARGET and the target time, as described above. The messages 130 and/or 134 provide a functional alert to the user of the user interface 48a such as, for example, the gate agent at the gate 38a, recommending that the selected flight, which is to depart from the gate 38a with the airplane 40a, should depart earlier; such an earlier departure could then be implemented by the gate agent for one or more reasons such as, for example, improving the chance that the selected flight will arrive on time, and/or reducing the need for a fast, fuel-inefficient flight plan, thereby saving on en-route fuel burn while still arriving on time. As shown in FIG. 22, in an exemplary embodiment, the messages 130 and 134 are positioned proximate the group 78; in several exemplary embodiments, the messages 130 and/or 134 are positioned in one or more other locations, in a pop-up dialog box or window, and/or any combination thereof.

In an exemplary embodiment, the gate agent at the gate 38a can use the recommended earlier departure, which is outputted in the step 58, if the gate agent determines that he or she needs to have the flight depart earlier to improve customer service by improving arrival performance, based on the gate agent's discretion, if such an earlier departure will not cause any additional passengers, bags, freight or mail to miss the selected flight. In an exemplary embodiment, the delay message outputted in the step 58s is based on flight plan data and current operating conditions at, for example, the gate 38a. In an exemplary embodiment, the messages 130 and/or 134 are not published or communicated externally, but are used for internal decision making only, with the gate agent at the gate 38a making the decision to meet the target time based on his or her own discretion, without approval from management or operations. In an exemplary embodiment, during the step 58, and in accordance with the foregoing, the gate agent at the gate 38a is alerted to the possibility of an earlier departure of the selected flight to improve customer service by improving arrival performance.

In an exemplary embodiment, the steps 58a, 58c, 58e, 58g, 58i, 58l, 58o and 58q are continuously and simultaneously or nearly simultaneously executed, and the steps 58b, 58d, 58f, 58h, 58j, 58k, 58m, 58n, 58r and 58s are continuously and simultaneously executed as necessary. In several exemplary embodiments, the steps 58a, 58c, 58e, 58g, 58i, 58l, 58o and 58q are executed in whole or in part with the engine 12.

As noted above, in an exemplary embodiment, during the execution of the method 52 including the steps 54, 56 and 58, the data received in the step 54 is continually updated, continually updated at predetermined time intervals such as, for example, every 45 seconds, and/or any combination thereof, thereby ensuring that the data received in the step 54 remains current and accurate; in an exemplary embodiment, the step 54 further includes refreshing the received data with recent updates of the data from the aforementioned one or more data sources, issuing one or more queries for updated data from the one or more data sources, issuing one or more queries for updated data from the one or more data sources at predetermined time intervals such as, for example, every 45 seconds, issuing one or more queries for all of the data previously received in the step 54, issuing one or more queries for all of the data previously received in the step 54 at predetermined time intervals such as, for example, every 45 seconds, and/or any combination thereof. As a result, the one or more parameters outputted in the step 56 and the one or more functional alerts provided in the step 58 are continually updated or refreshed, continually updated or refreshed at predetermined time intervals such as, for example, every 45 seconds, and/or any combination thereof.

In several exemplary embodiments, the method 52 is implemented by, or at least partially implemented by, the engine 12 and/or components thereof, the module 18 and/or components thereof, the user interfaces 48a, 48b and 48c and/or components thereof, and/or any combination thereof.

As noted above, the execution of the method 52 with the gate 38a is substantially similar to the execution of the method 52 with the gate 38b, and is substantially similar to the execution of the method 52 with the gate 38c. Therefore, the execution of the method 52 with each of the gates 38a and 38b will not be described in detail. In several exemplary embodiments, the respective executions of the method 52 with each of the gates 38b and 38c, and/or portions thereof, occur simultaneously, serially and/or any combination thereof.

In several exemplary embodiments, the operation of the system 36 in whole or in part, the operation of the module 18 in whole or in part, the execution of the method 52 in whole or in part, and/or any combination thereof, displays and/or other communicates at least most of the relevant information about a selected flight departure to a gate agent to improve the management of the flight departure and improve customer service, with such information including one or more of the following: flight number, destination or arrival location, scheduled and published departure times, reasons for delay if applicable, departure gate, target departure time, difference between flight-planned and scheduled block times, time when current gate is scheduled for another aircraft, detailed information of the crew resources for the flight (pilots and flight attendants), number of inbound connecting passengers at risk of misconnecting, detailed information for all inbound connections, protect options for inbound connections to same destination for the rest of the day, detailed information for all outbound connections, and protect options to same destination for the rest of the day for outbound connections.

In several exemplary embodiments, the operation of the system 36 in whole or in part, the operation of the module 18 in whole or in part, the execution of the method 52 in whole or in part, and/or any combination thereof, allows a gate agent to be proactively alerted to changes in airline operations, instead of having to rely on the gate agent to periodically check one or more applications and/or reservation systems for updates.

In several exemplary embodiments, the operation of the system 36 in whole or in part, the operation of the module 18 in whole or in part, the execution of the method 52 in whole or in part, and/or any combination thereof, includes providing additional information to, for example, gate agents, with such additional information including, for example, longer and/or more detailed explanations concerning reasons for any flight delays, a history of gate changes for a selected flight, a history of delays for a selected flight, etc.

In several exemplary embodiments, the output device 48ac includes a screen or graphical display, and further includes a printer at the subject airline gate so that the gate agent can selectively print some of the valuable information being provided by the module 18, the system 36, the execution of the method 52, and/or any combination thereof, or so that the information is automatically printed on the printer.

In an exemplary embodiment, the module 18 is a web-based application written in, for example. Java and Adobe Flex, which pulls real-time information from the engine 12, automatically refreshing with the latest information every, for example, 45 seconds, and gate agents can access the web-based application at a webpage via a link; as a result, gate agents can easily and quickly see any updates as soon, or almost as soon, as the updates occur, increasing the possibility that the gate agents will know of updates before, or at the same time as, any customers or passengers know of the updates.

In an exemplary embodiment, the operation of the system 36 in whole or in part, the operation of the module 18 in whole or in part, the execution of the method 52 in whole or in part, and/or any combination thereof, provides for the display of relevant real-time information in an easy-to-read format that does not require repeated requests on the part of a gate agent to other applications or reservation systems, and further provides alerts such as, for example, pop-up messages, to notify gate agents when changes are detected for a selected flight. In an exemplary embodiment, the operation of the system 36 in whole or in part, the operation of the module 18 in whole or in part, the execution of the method 52 in whole or in part, and/or any combination thereof, provides an automated process to make real-time flight information readily available to gate agents and push updates to the gate agents in the form of, for example, pop-up messages; as a result, gate agents have immediate access to real-time flight information such as, for example, inbound resource information, gate changes and departure delays, connecting passenger information, flight plan details, etc.; gate agents can provide more accurate and timely information to customers regarding flight delays; and customers are more informed regarding flight delays, and what the airline is doing to handle the delays, and thus the customers are more at ease about their circumstances and have more confidence in the airline's ability to manage delays effectively.

In an exemplary embodiment, the module 18 is an Intranet-based program, a web-based application, and/or any combination thereof, and is designed to assist gate agents, displaying useful flight information in an easy-to-read format, which information is automatically updated every, for example, 45 seconds, thereby providing the gate agents with the most up-to-date information and eliminating, or at least reducing, repeated requests by gate agents to one or more reservation systems.

Figure 23:
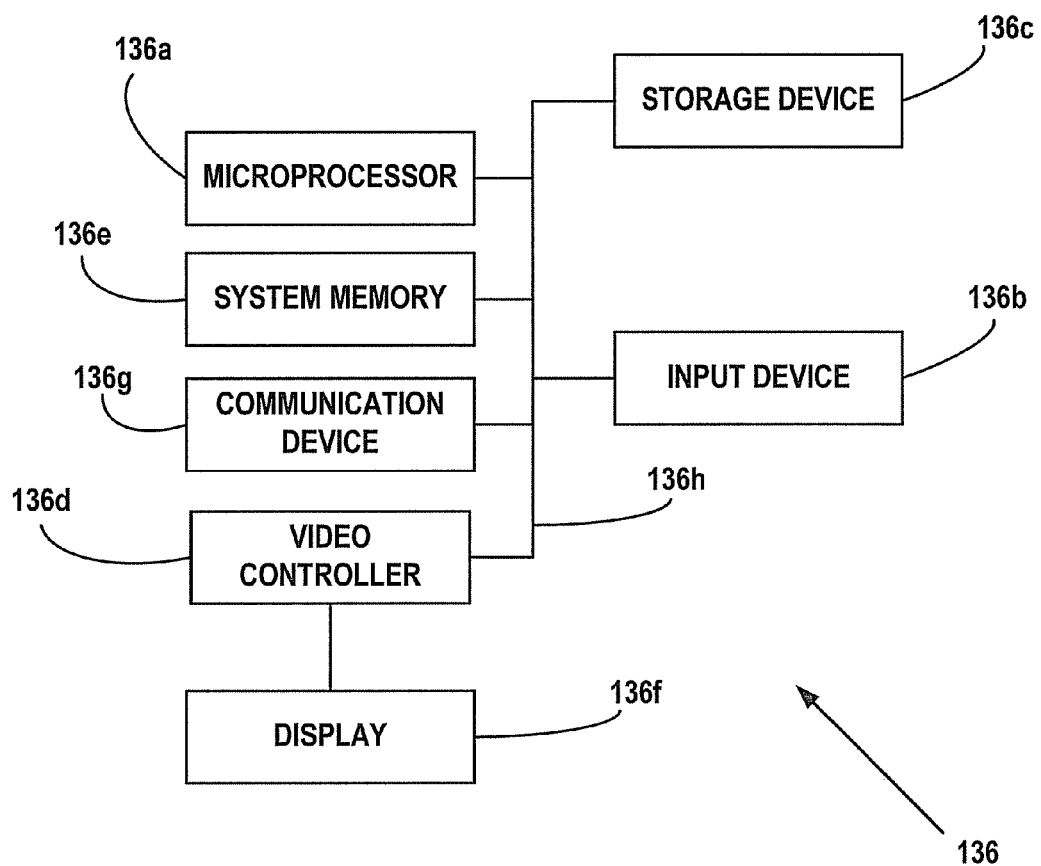
FIG. 23 is a diagrammatic illustration of a node for implementing one or more exemplary embodiments of the present disclosure, according to an exemplary embodiment.

In an exemplary embodiment, as illustrated in FIG. 23 with continuing reference to FIGS. 1-22, an illustrative node 136 for implementing one or more embodiments of one or more of the above-described networks, elements, methods and/or steps, and/or any combination thereof, is depicted. The node 136 includes a microprocessor 136a, an input device 136b, a storage device 136c, a video controller 136d, a system memory 136e, a display 136f, and a communication device 136g all interconnected by one or more buses 136h. In several exemplary embodiments, the storage device 136c may include a floppy drive, hard drive, CD-ROM, optical drive, any other form of storage device and/or any combination thereof. In several exemplary embodiments, the storage device 136c may include, and/or be capable of receiving, a floppy disk, CD-ROM. DVD-ROM, or any other form of computer-readable medium that may contain executable instructions. In several exemplary embodiments, the communication device 136g may include a modem, network card, or any other device to enable the node to communicate with other nodes. In several exemplary embodiments, any node represents a plurality of interconnected (whether by intranet or Internet) computer systems, including without limitation, personal computers, mainframes. PDAs, and cell phones.

In several exemplary embodiments, one or more of the engine 12, the module 18, the user interfaces 48a, 48b and 48c, are, or at least include, the node 136 and/or components thereof, and/or one or more nodes that are substantially similar to the node 136 and/or components thereof.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, personal digital assistants (PDAs), or personal computing devices (PLDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, the network 50, and/or one or more portions thereof, may be designed to work on any specific architecture. In an exemplary embodiment, one or more portions of the network 50 may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

A method has been described that includes receiving data associated with a selected airline flight from one or more data sources; outputting one or more parameters in response to receiving data associated with the selected airline flight, comprising displaying one or more parameters associated with the selected airline flight on an output device; and during displaying one or more parameters associated with the selected airline flight on the output device, displaying on the output device at least two of the following: one or more parameters associated with alternate flights; one or more parameters associated with inbound flight connections; one or more parameters associated with downline flight connections; one or more parameters associated with passenger connections; one or more parameters associated with inbound crew; and one or more parameters associated with inbound aircraft; and providing one or more functional alerts specific to the selected airline flight. In an exemplary embodiment, providing one or more functional alerts specific to the selected airline flight comprises if there is a change in the estimated time of departure of the selected airline flight, then providing a functional alert regarding the change in the estimated time of departure of the selected airline flight; if there is a change in the departure gate of the selected airline flight, then providing a functional alert regarding the change in the departure gate of the selected airline flight; and if there is a cancellation of the selected airline flight, then providing a functional alert regarding the cancellation of the selected airline flight. In an exemplary embodiment, providing the functional alert regarding the change in the estimated time of departure of the selected airline flight comprises displaying a dialog box on the output device, the dialog box including a message indicating that the estimated time of departure of the selected airline flight has changed; wherein providing the functional alert regarding the change in the departure gate of the selected airline flight comprises displaying a dialog box on the output device, the dialog box including a message indicating that the departure gate of the selected airline flight has changed; wherein providing the functional alert regarding the cancellation of the selected airline flight comprises displaying a dialog box on the output device, the dialog box including a message indicating that the selected airline flight has been cancelled; and wherein each of the respective dialog boxes is at least partially displayed over, and/or otherwise interrupts, any other output displayed on the output device. In an exemplary embodiment, the selected airline flight has a scheduled time of departure, an estimated time of departure, a flight-planned block time, and a scheduled block time; and wherein providing one or more functional alerts specific to the selected airline flight comprises if there is a difference between the flight-planned block time and the scheduled block time, then generating a target time of departure of the selected airline flight; and displaying on the output device the target time of departure of the selected airline flight; if the flight-planned block time is shorter than the scheduled block time, then displaying on the output device and proximate the target time a message indicating that the departure of the selected flight can be delayed until the target time of departure; and if the flight-planned block time is longer than the scheduled block time, then displaying on the output device and proximate the target time a message recommending that the selected airline flight depart earlier at the target time of departure. In an exemplary embodiment, the method comprises displaying selectable first, second, third and fourth symbols on the output device; during the display of the one or more parameters associated with the selected airline flight, displaying on the output device the one or more parameters associated with the inbound flight connections in response to the selection of the first symbol; during the display of the one or more parameters associated with the selected airline flight, displaying on the output device the one or more parameters associated with the downline flight connections in response to the selection of the second symbol; during the display of the one or more parameters associated with the selected airline flight, displaying on the output device the one or more parameters associated with the passenger connections in response to the selection of the third symbol; and during the display of the one or more parameters associated with the selected airline flight, displaying on the output device the one or more parameters associated with the inbound aircraft in response to the selection of the fourth symbol. In an exemplary embodiment, receiving data associated with the selected airline flight from one or more data sources comprises selecting a station; selecting a departure gate located at the station; searching for flights departing from the departure gate; displaying on the output device the flights departing from the departure gate; selecting one of the flights departing from the departure gate, wherein the selected airline flight is the one of the flights departing from the departure gate; and loading data for the selected airline flight. In an exemplary embodiment, the method comprises providing an operational data source and forecasting engine; forecasting one or more times using the engine; wherein the times are associated with a plurality of transportation transactions, the plurality of transportation transactions comprising the selected airline flight; wherein receiving data associated with the selected airline flight from one or more data sources further comprises issuing a query for data associated with the selected airline flight using the engine; and continually updating the loaded data for the selected airline flight by repeatedly issuing the query at a predetermined time interval; and wherein the parameters displayed on the output device are updated at the predetermined interval.

A system has been described that includes means for receiving data associated with a selected airline flight from one or more data sources; means for outputting one or more parameters in response to receiving data associated with the selected airline flight, comprising means for displaying one or more parameters associated with the selected airline flight on an output device; and means for during displaying one or more parameters associated with the selected airline flight on the output device, displaying on the output device at least two of the following: one or more parameters associated with alternate flights; one or more parameters associated with inbound flight connections; one or more parameters associated with downline flight connections; one or more parameters associated with passenger connections; one or more parameters associated with inbound crew; and one or more parameters associated with inbound aircraft; and means for providing one or more functional alerts specific to the selected airline flight. In an exemplary embodiment, means for providing one or more functional alerts specific to the selected airline flight comprises means for if there is a change in the estimated time of departure of the selected airline flight, then providing a functional alert regarding the change in the estimated time of departure of the selected airline flight; means for if there is a change in the departure gate of the selected airline flight, then providing a functional alert regarding the change in the departure gate of the selected airline flight; and means for if there is a cancellation of the selected airline flight, then providing a functional alert regarding the cancellation of the selected airline flight. In an exemplary embodiment, means for providing the functional alert regarding the change in the estimated time of departure of the selected airline flight comprises means for displaying a dialog box on the output device, the dialog box including a message indicating that the estimated time of departure of the selected airline flight has changed; wherein means for providing the functional alert regarding the change in the departure gate of the selected airline flight comprises means for displaying a dialog box on the output device, the dialog box including a message indicating that the departure gate of the selected airline flight has changed; wherein means for providing the functional alert regarding the cancellation of the selected airline flight comprises means for displaying a dialog box on the output device, the dialog box including a message indicating that the selected airline flight has been cancelled; and wherein each of the respective dialog boxes is at least partially displayed over, and/or otherwise interrupts, any other output displayed on the output device. In an exemplary embodiment, the selected airline flight has a scheduled time of departure, an estimated time of departure, a flight-planned block time, and a scheduled block time; and wherein means for providing one or more functional alerts specific to the selected airline flight comprises means for if there is a difference between the flight-planned block time and the scheduled block time, then generating a target time of departure of the selected airline flight; and displaying on the output device the target time of departure of the selected airline flight; if the flight-planned block time is shorter than the scheduled block time, then displaying on the output device and proximate the target time a message indicating that the departure of the selected flight can be delayed until the target time of departure; and if the flight-planned block time is longer than the scheduled block time, then displaying on the output device and proximate the target time a message recommending that the selected airline flight depart earlier at the target time of departure. In an exemplary embodiment, the system comprises means for displaying selectable first, second, third and fourth symbols on the output device; means for during the display of the one or more parameters associated with the selected airline flight, displaying on the output device the one or more parameters associated with the inbound flight connections in response to the selection of the first symbol; means for during the display of the one or more parameters associated with the selected airline flight, displaying on the output device the one or more parameters associated with the downline flight connections in response to the selection of the second symbol; means for during the display of the one or more parameters associated with the selected airline flight, displaying on the output device the one or more parameters associated with the passenger connections in response to the selection of the third symbol; and means for during the display of the one or more parameters associated with the selected airline flight, displaying on the output device the one or more parameters associated with the inbound aircraft in response to the selection of the fourth symbol. In an exemplary embodiment, means for receiving data associated with the selected airline flight from one or more data sources comprises means for selecting a station; means for selecting a departure gate located at the station; means for searching for flights departing from the departure gate; means for displaying on the output device the flights departing from the departure gate; means for selecting one of the flights departing from the departure gate, wherein the selected airline flight is the one of the flights departing from the departure gate; and means for loading data for the selected airline flight. In an exemplary embodiment, the system comprises means for providing an operational data source and forecasting engine; means for forecasting one or more times using the engine; wherein the times are associated with a plurality of transportation transactions, the plurality of transportation transactions comprising the selected airline flight; wherein means for receiving data associated with the selected airline flight from one or more data sources further comprises means for issuing a query for data associated with the selected airline flight using the engine; and means for continually updating the loaded data for the selected airline flight by repeatedly issuing the query at a predetermined time interval; and wherein the parameters displayed on the output device are updated at the predetermined interval.

A system has been described that includes a computer readable medium comprising a plurality of instructions stored therein, the plurality of instructions comprising instructions for receiving data associated with a selected airline flight from one or more data sources; instructions for outputting one or more parameters in response to receiving data associated with the selected airline flight, comprising instructions for displaying one or more parameters associated with the selected airline flight on an output device; and instructions for during displaying one or more parameters associated with the selected airline flight on the output device, displaying on the output device at least two of the following: one or more parameters associated with alternate flights; one or more parameters associated with inbound flight connections; one or more parameters associated with downline flight connections; one or more parameters associated with passenger connections; one or more parameters associated with inbound crew; and one or more parameters associated with inbound aircraft; and instructions for providing one or more functional alerts specific to the selected airline flight. In an exemplary embodiment, the system comprises an airline gate from which the selected airline flight is scheduled to depart; and a user interface located at the airline gate, the user interface comprising the output device. In an exemplary embodiment, instructions for providing one or more functional alerts specific to the selected airline flight comprise instructions for if there is a change in the estimated time of departure of the selected airline flight, then providing a functional alert regarding the change in the estimated time of departure of the selected airline flight; instructions for if there is a change in the departure gate of the selected airline flight, then providing a functional alert regarding the change in the departure gate of the selected airline flight; and instructions for if there is a cancellation of the selected airline flight, then providing a functional alert regarding the cancellation of the selected airline flight. In an exemplary embodiment, instructions for providing the functional alert regarding the change in the estimated time of departure of the selected airline flight comprise instructions for displaying a dialog box on the output device, the dialog box including a message indicating that the estimated time of departure of the selected airline flight has changed; wherein instructions for providing the functional alert regarding the change in the departure gate of the selected airline flight comprise instructions for displaying a dialog box on the output device, the dialog box including a message indicating that the departure gate of the selected airline flight has changed; wherein instructions for providing the functional alert regarding the cancellation of the selected airline flight comprise instructions for displaying a dialog box on the output device, the dialog box including a message indicating that the selected airline flight has been cancelled; and wherein each of the respective dialog boxes is at least partially displayed over, and/or otherwise interrupts, any other output displayed on the output device. In an exemplary embodiment, the selected airline flight has a scheduled time of departure, an estimated time of departure, a flight-planned block time, and a scheduled block time; and wherein instructions for providing one or more functional alerts specific to the selected airline flight comprise instructions for if there is a difference between the flight-planned block time and the scheduled block time, then generating a target time of departure of the selected airline flight; and displaying on the output device the target time of departure of the selected airline flight; if the flight-planned block time is shorter than the scheduled block time, then displaying on the output device and proximate the target time a message indicating that the departure of the selected flight can be delayed until the target time of departure; and if the flight-planned block time is longer than the scheduled block time, then displaying on the output device and proximate the target time a message recommending that the selected airline flight depart earlier at the target time of departure. In an exemplary embodiment, the plurality of instructions further comprises instructions for displaying selectable first, second, third and fourth symbols on the output device; instructions for during the display of the one or more parameters associated with the selected airline flight, displaying on the output device the one or more parameters associated with the inbound flight connections in response to the selection of the first symbol; instructions for during the display of the one or more parameters associated with the selected airline flight, displaying on the output device the one or more parameters associated with the downline flight connections in response to the selection of the second symbol; instructions for during the display of the one or more parameters associated with the selected airline flight, displaying on the output device the one or more parameters associated with the passenger connections in response to the selection of the third symbol; and instructions for during the display of the one or more parameters associated with the selected airline flight, displaying on the output device the one or more parameters associated with the inbound aircraft in response to the selection of the fourth symbol. In an exemplary embodiment, instructions for receiving data associated with the selected airline flight from one or more data sources comprise instructions for selecting a station; instructions for selecting a departure gate located at the station; instructions for searching for flights departing from the departure gate; instructions for displaying on the output device the flights departing from the departure gate; instructions for selecting one of the flights departing from the departure gate, wherein the selected airline flight is the one of the flights departing from the departure gate; and instructions for loading data for the selected airline flight. In an exemplary embodiment, the system comprises an operational data source and forecasting engine; wherein the plurality of instructions further comprises instructions for forecasting one or more times using the engine; wherein the times are associated with a plurality of transportation transactions, the plurality of transportation transactions comprising the selected airline flight; wherein instructions for receiving data associated with the selected airline flight from one or more data sources further comprise instructions for issuing a query for data associated with the selected airline flight using the engine; and instructions for continually updating the loaded data for the selected airline flight by repeatedly issuing the query at a predetermined time interval; and wherein the parameters displayed on the output device are updated at the predetermined interval.

A method has been described that includes receiving data associated with a selected airline flight from one or more data sources, the selected airline flight having a scheduled time of departure, an estimated time of departure, a flight-planned block time, and a scheduled block time; and providing one or more functional alerts specific to the selected airline flight, comprising if there is a difference between the flight-planned block time and the scheduled block time, then generating a target time of departure of the selected airline flight; and displaying on an output device the target time of departure of the selected airline flight; if the flight-planned block time is shorter than the scheduled block time, then displaying on the output device and proximate the target time a message indicating that the departure of the selected airline flight can be delayed; and if the flight-planned block time is longer than the scheduled block time, then displaying on the output device and proximate the target time a message recommending that the selected airline flight depart earlier. In an exemplary embodiment, providing one or more functional alerts specific to the selected airline flight further comprises if the flight-planned block time and the scheduled block time are substantially equal, then displaying on the output device the scheduled time of departure of the selected airline flight; and displaying on the output device and proximate the scheduled time of departure a message indicating that the selected airline flight is to depart on schedule. In an exemplary embodiment, providing one or more functional alerts specific to the selected airline flight further comprises if the estimated time of departure is later than the scheduled time of departure, then displaying on the output device the estimated time of departure and a message proximate thereto indicating that the departure of the selected airline flight is late. In an exemplary embodiment, the method comprises determining whether the difference between the flight-planned block time and the scheduled block time can be calculated; and if the difference between the flight-planned block time and the scheduled block time cannot be calculated, then displaying a message on the output device indicating that the difference between the flight-planned block time and the scheduled block time cannot be calculated. In an exemplary embodiment, the method comprises outputting a group of parameters specific to the selected airline flight, comprising displaying the group of parameters on the output device, the parameters comprising a flight number of the selected airline flight, the scheduled time of departure of the selected airline flight, and the estimated time of departure of the selected airline flight; wherein the target time and either the message indicating that the departure of the selected airline flight can be delayed or the message recommending that the selected airline flight depart earlier are displayed on the output device during the display of the group of parameters on the output device. In an exemplary embodiment, the method comprises providing an operational data source and forecasting engine; forecasting one or more times using the engine; wherein the times are associated with a plurality of transportation transactions, the plurality of transportation transactions comprising the selected airline flight; wherein the times comprise one or more of the scheduled time of departure, the estimated time of departure, the flight-planned block time, and the scheduled block time. In an exemplary embodiment, generating the target time comprises adjusting the estimated time of departure, the adjustment being partially dependent upon one or more of the following: one or more parameters associated with alternate flights; one or more parameters associated with inbound flight connections; one or more parameters associated with downline flight connections; one or more parameters associated with passenger connections; one or more parameters associated with inbound crew; and one or more parameters associated with inbound aircraft.

A system has been described that includes means for receiving data associated with a selected airline flight from one or more data sources, the selected airline flight having a scheduled time of departure, an estimated time of departure, a flight-planned block time, and a scheduled block time; and means for providing one or more functional alerts specific to the selected airline flight, comprising means for if there is a difference between the flight-planned block time and the scheduled block time, then generating a target time of departure of the selected airline flight; and displaying on an output device the target time of departure of the selected airline flight; if the flight-planned block time is shorter than the scheduled block time, then displaying on the output device and proximate the target time a message indicating that the departure of the selected airline flight can be delayed; and if the flight-planned block time is longer than the scheduled block time, then displaying on the output device and proximate the target time a message recommending that the selected airline flight depart earlier. In an exemplary embodiment, means for providing one or more functional alerts specific to the selected airline flight further comprises means for if the flight-planned block time and the scheduled block time are substantially equal, then displaying on the output device the scheduled time of departure of the selected airline flight; and displaying on the output device and proximate the scheduled time of departure a message indicating that the selected airline flight is to depart on schedule. In an exemplary embodiment, means for providing one or more functional alerts specific to the selected airline flight further comprises means for if the estimated time of departure is later than the scheduled time of departure, then displaying on the output device the estimated time of departure and a message proximate thereto indicating that the departure of the selected airline flight is late. In an exemplary embodiment, the system comprises means for determining whether the difference between the flight-planned block time and the scheduled block time can be calculated; and means for if the difference between the flight-planned block time and the scheduled block time cannot be calculated, then displaying a message on the output device indicating that the difference between the flight-planned block time and the scheduled block time cannot be calculated. In an exemplary embodiment, the system comprises means for outputting a group of parameters specific to the selected airline flight, comprising displaying the group of parameters on the output device, the parameters comprising a flight number of the selected airline flight, the scheduled time of departure of the selected airline flight, and the estimated time of departure of the selected airline flight; wherein the target time and either the message indicating that the departure of the selected airline flight can be delayed or the message recommending that the selected airline flight depart earlier are displayed on the output device during the display of the group of parameters on the output device. In an exemplary embodiment, the system comprises means for providing an operational data source and forecasting engine; means for forecasting one or more times using the engine; wherein the times are associated with a plurality of transportation transactions, the plurality of transportation transactions comprising the selected airline flight; wherein the times comprise one or more of the scheduled time of departure, the estimated time of departure, the flight-planned block time, and the scheduled block time. In an exemplary embodiment, means for generating the target time comprises means for adjusting the estimated time of departure, the adjustment being partially dependent upon one or more of the following: one or more parameters associated with alternate flights; one or more parameters associated with inbound flight connections; one or more parameters associated with downline flight connections; one or more parameters associated with passenger connections; one or more parameters associated with inbound crew; and one or more parameters associated with inbound aircraft.

A system has been described that includes a computer readable medium comprising a plurality of instructions stored therein, the plurality of instructions comprising instructions for receiving data associated with a selected airline flight from one or more data sources, the selected airline flight having a scheduled time of departure, an estimated time of departure, a flight-planned block time, and a scheduled block time; and instructions for providing one or more functional alerts specific to the selected airline flight, comprising instructions for if there is a difference between the flight-planned block time and the scheduled block time, then generating a target time of departure of the selected airline flight; and displaying on an output device the target time of departure of the selected airline flight; if the flight-planned block time is shorter than the scheduled block time, then displaying on the output device and proximate the target time a message indicating that the departure of the selected airline flight can be delayed; and if the flight-planned block time is longer than the scheduled block time, then displaying on the output device and proximate the target time a message recommending that the selected airline flight depart earlier. In an exemplary embodiment, the system comprises an airline gate from which the selected airline flight is scheduled to depart; and a user interface located at the airline gate, the user interface comprising the output device. In an exemplary embodiment, instructions for providing one or more functional alerts specific to the selected airline flight further comprises instructions for if the flight-planned block time and the scheduled block time are substantially equal, then displaying on the output device the scheduled time of departure of the selected airline flight; and displaying on the output device and proximate the scheduled time of departure a message indicating that the selected airline flight is to depart on schedule. In an exemplary embodiment, instructions for providing one or more functional alerts specific to the selected airline flight further comprises instructions for if the estimated time of departure is later than the scheduled time of departure, then displaying on the output device the estimated time of departure and a message proximate thereto indicating that the departure of the selected airline flight is late. In an exemplary embodiment, the system comprises instructions for determining whether the difference between the flight-planned block time and the scheduled block time can be calculated; and instructions for if the difference between the flight-planned block time and the scheduled block time cannot be calculated, then displaying a message on the output device indicating that the difference between the flight-planned block time and the scheduled block time cannot be calculated. In an exemplary embodiment, the system comprises instructions for outputting a group of parameters specific to the selected airline flight, comprising displaying the group of parameters on the output device, the parameters comprising a flight number of the selected airline flight, the scheduled time of departure of the selected airline flight, and the estimated time of departure of the selected airline flight; wherein the target time and either the message indicating that the departure of the selected airline flight can be delayed or the message recommending that the selected airline flight depart earlier are displayed on the output device during the display of the group of parameters on the output device. In an exemplary embodiment, the system comprises an operational data source and forecasting engine; wherein the plurality of instructions further comprises instructions for forecasting one or more times using the engine; wherein the times are associated with a plurality of transportation transactions, the plurality of transportation transactions comprising the selected airline flight; and wherein the times comprise one or more of the scheduled time of departure, the estimated time of departure, the flight-planned block time, and the scheduled block time. In an exemplary embodiment, instructions for generating the target time comprise instructions for adjusting the estimated time of departure, the adjustment being partially dependent upon one or more of the following: one or more parameters associated with alternate flights; one or more parameters associated with inbound flight connections; one or more parameters associated with downline flight connections; one or more parameters associated with passenger connections; one or more parameters associated with inbound crew; and one or more parameters associated with inbound aircraft.

It is understood that variations may be made in the foregoing without departing from the scope of the disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries. In an exemplary embodiment, aspects of the present disclosure are readily applicable and/or readily adaptable to a shipping transaction before, during or after which a ship travels from one port to another port and, in some case, on to one or more other ports. In an exemplary embodiment, aspects of the present disclosure are readily applicable and/or readily adaptable to a trucking transaction before, during or after which a truck travels from one location to another location and, in some case, on to one or more other locations. In an exemplary embodiment, aspects of the present disclosure are readily applicable and/or readily adaptable to a rail transaction before, during or after which a train travels from one city or station to another city or station and, in some cases, on to one or more other cities or stations. In an exemplary embodiment, aspects of the present disclosure are applicable and/or readily adaptable to a wide variety of transportation transactions such as, for example, an airline sequence, a leg of an airline sequence, an airline block, and/or any combination thereof.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A method comprising:

receiving, using a computer system, data associated with a selected airline flight from one or more data sources, the selected airline flight having an estimated time of departure from a departure gate; and providing, using the computer system, one or more functional alerts specific to the selected airline flight, comprising:

determining if an event has occurred; and if the event has occurred, then providing a functional alert regarding the occurrence of the event, comprising displaying an alert output on an output device, the alert output comprising a message indicating that the event has occurred;

wherein the selected airline flight further has a scheduled time of departure from the departure gate, a scheduled time of arrival at an arrival gate, an estimated time of arrival at the arrival gate, a flight-planned block time equaling a first time period that begins at the estimated time of departure and ends at the estimated time of arrival, and a scheduled block time equaling a second time period that begins at the scheduled time of departure and ends at the scheduled time of arrival; and wherein providing one or more functional alerts specific to the selected airline flight further comprises:

determining if there is a difference between the flight-planned block time and the scheduled block time;

if there is a difference between the flight-planned block time and the scheduled block time, then:

generating a target time of departure of the selected airline flight; and displaying on the output device the target time of departure of the selected airline flight;

if the flight-planned block time is shorter than the scheduled block time, then:

displaying on the output device and proximate the displayed target time a message indicating that the departure of the selected airline flight can be delayed until the target time of departure;

wherein the displayed target time is later in time than each of the scheduled time of departure and the estimated time of departure; and if the flight-planned block time is longer than the scheduled block time, then:
displaying on the output device and proximate the displayed target time a message recommending that the selected airline flight depart earlier at the target time of departure;
wherein the displayed target time is earlier in time than each of the scheduled time of departure and the estimated time of departure;
and
if the flight-planned block time and the scheduled block time are substantially equal, then displaying on the output device a message indicating that the selected airline flight is to depart on schedule.

2. The method of claim 1, wherein the event is selected from the group consisting of a change in the estimated time of departure of the selected airline flight, a change in the departure gate of the selected airline flight, and a cancellation of the selected airline flight.

3. A computer readable medium that is non-transitory, the computer readable medium comprising a plurality of instructions stored therein and executable by one or more processors, the plurality of instructions comprising:
instructions for receiving data associated with a selected airline flight from one or more data sources, the selected airline flight having an estimated time of departure from a departure gate; and
instructions for providing one or more functional alerts specific to the selected airline flight, comprising:
instructions for determining if an event has occurred; and
instructions for if the event has occurred, then providing a functional alert regarding the occurrence of the event, comprising displaying an alert output on an output device, the alert output comprising a message indicating that the event has occurred;
wherein the selected airline flight further has a scheduled time of departure from the departure gate, a scheduled time of arrival at an arrival gate, an estimated time of arrival at the arrival gate, a flight-planned block time equaling a first time period that begins at the estimated time of departure and ends at the estimated time of arrival, and a scheduled block time equaling a second time period that begins at the scheduled time of departure and ends at the scheduled time of arrival; and
wherein instructions for providing one or more functional alerts specific to the selected airline flight further comprise:
instructions for:
determining if there is a difference between the flight-planned block time and the scheduled block time;
if there is a difference between the flight-planned block time and the scheduled block time, then:
generating a target time of departure of the selected airline flight;
and
displaying on the output device the target time of departure of the selected airline flight;
if the flight-planned block time is shorter than the scheduled block time, then:
displaying on the output device and proximate the displayed target time a message indicating that the departure of the selected airline flight can be delayed until the target time of departure;
wherein the displayed target time is later in time than each of the scheduled time of departure and the estimated time of departure; and
if the flight-planned block time is longer than the scheduled block time, then:
displaying on the output device and proximate the displayed target time a message recommending that the selected airline flight depart earlier at the target time of departure;
wherein the displayed target time is earlier in time than each of the scheduled time of departure and the estimated time of departure;
and
if the flight-planned block time and the scheduled block time are substantially equal, then displaying on the output device a message indicating that the selected airline flight is to depart on schedule.

4. The computer readable medium of claim 3, wherein the event is selected from the group consisting of a change in the estimated time of departure of the selected airline flight, a change in the departure gate of the selected airline flight, and a cancellation of the selected airline flight.

5. A method comprising:
receiving, using a computer system, data associated with a selected airline flight from one or more data sources, the selected airline flight having an estimated time of departure from a departure gate;
outputting, using the computer system, one or more parameters in response to receiving data associated with the selected airline flight, comprising:
displaying one or more parameters associated with the selected airline flight on an output device; and
during displaying one or more parameters associated with the selected airline flight on the output device, displaying on the output device at least two of the following:
one or more parameters associated with alternate flights;
one or more parameters associated with inbound flight connections;
one or more parameters associated with downline flight connections;
one or more parameters associated with passenger connections;
one or more parameters associated with inbound crew; and
one or more parameters associated with inbound aircraft; and
providing, using the computer system, one or more functional alerts specific to the selected airline flight, comprising:
determining if there is a change in the estimated time of departure of the selected airline flight;
if there is a change in the estimated time of departure of the selected airline flight, then providing a functional alert regarding the change in the estimated time of departure of the selected airline flight, comprising:
displaying a first alert output on the output device in response to the change in the estimated time of departure to thereby provide a first immediate notification, the first alert output comprising a first dialog box, the first dialog box including a first message indicating that the estimated time of departure of the selected airline flight has changed;
wherein the first dialog box is at least partially displayed over, and/or otherwise interrupts, any other output displayed on the output device; and
wherein closure of the first dialog box requires a first affirmative action, thereby requiring acknowledgment of the change in the estimated time of departure of the selected airline flight;

determining if there is a change in the departure gate of the selected airline flight;
if there is a change in the departure gate of the selected airline flight, then providing a functional alert regarding the change in the departure gate of the selected airline flight, comprising:
   displaying a second alert output on the output device in response to the change in the departure gate to thereby provide a second immediate notification, the second alert output comprising a second dialog box, the second dialog box including a second message indicating that the departure gate of the selected airline flight has changed;
   wherein the second dialog box is at least partially displayed over, and/or otherwise interrupts, any other output displayed on the output device; and
   wherein closure of the second dialog box requires a second affirmative action, thereby requiring acknowledgment of the change in the departure gate of the selected airline flight;
determining if there is a cancellation of the selected airline flight;
and
if there is a cancellation of the selected airline flight, then providing a functional alert regarding the cancellation of the selected airline flight, comprising:
   displaying a third alert output on the output device in response to the cancellation to thereby provide a third immediate notification, the third alert output comprising a third dialog box, the third dialog box including a third message indicating that the selected airline flight has been canceled;
   wherein the third dialog box is at least partially displayed over, and/or otherwise interrupts, any other output displayed on the output device; and
   wherein closure of the third dialog box requires a third affirmative action, thereby requiring acknowledgment of the cancellation of the selected airline flight
wherein the selected airline flight further has a scheduled time of departure from the departure gate, a scheduled time of arrival at an arrival gate, an estimated time of arrival at the arrival gate, a flight-planned block time equaling a first time period that begins at the estimated time of departure and ends at the estimated time of arrival, and a scheduled block time equaling a second time period that begins at the scheduled time of departure and ends at the scheduled time of arrival; and
wherein providing one or more functional alerts specific to the selected airline flight further comprises:
   determining if there is a difference between the flight-planned block time and the scheduled block time;
   if there is a difference between the flight-planned block time and the scheduled block time, then:
      generating a target time of departure of the selected airline flight; and
      displaying on the output device the target time of departure of the selected airline flight;
      if the flight-planned block time is shorter than the scheduled block time, then:
         displaying on the output device and proximate the displayed target time a message indicating that the departure of the selected airline flight can be delayed until the target time of departure;
         wherein the displayed target time is later in time than each of the scheduled time of departure and the estimated time of departure; and
      if the flight-planned block time is longer than the scheduled block time, then:
         displaying on the output device and proximate the displayed target time a message recommending that the selected airline flight depart earlier at the target time of departure;
         wherein the displayed target time is earlier in time than each of the scheduled time of departure and the estimated time of departure;
   and
   if the flight-planned block time and the scheduled block time are substantially equal, then displaying on the output device a message indicating that the selected airline flight is to depart on schedule.

6. The method of claim 5 further comprising:
displaying selectable first, second, third and fourth symbols on the output device;
during the display of the one or more parameters associated with the selected airline flight, displaying on the output device the one or more parameters associated with the inbound flight connections in response to the selection of the first symbol;
during the display of the one or more parameters associated with the selected airline flight, displaying on the output device the one or more parameters associated with the downline flight connections in response to the selection of the second symbol;
during the display of the one or more parameters associated with the selected airline flight, displaying on the output device the one or more parameters associated with the passenger connections in response to the selection of the third symbol; and
during the display of the one or more parameters associated with the selected airline flight, displaying on the output device the one or more parameters associated with the inbound aircraft in response to the selection of the fourth symbol.

7. The method of claim 5 wherein receiving data associated with the selected airline flight from one or more data sources comprises:
selecting a station at which the departure gate is located;
selecting the departure gate;
searching for flights departing from the departure gate;
displaying on the output device the flights departing from the departure gate;
selecting one of the flights departing from the departure gate, wherein the selected airline flight is the one of the flights departing from the departure gate; and
loading data for the selected airline flight.

8. The method of claim 5 further comprising:
providing an operational data source and forecasting engine;
forecasting one or more times using the engine;
wherein the times are associated with a plurality of transportation transactions, the plurality of transportation transactions comprising the selected airline flight;
wherein receiving data associated with the selected airline flight from one or more data sources further comprises:
   issuing a query for data associated with the selected airline flight using the engine; and
   continually updating the loaded data for the selected airline flight by repeatedly issuing the query at a predetermined time interval; and
wherein the parameters displayed on the output device are updated at the predetermined interval.

9. The method of claim 5, wherein generating the target time of departure of the selected airline flight comprises:

if the flight-planned block time is shorter than the scheduled block time, then adding a first amount of time to the estimated time of departure to thereby generate the target time of departure of the selected airline flight, wherein the first amount of time equals at least a percentage of the difference between the flight-planned and scheduled block times; and if the flight-planned block time is longer than the scheduled block time, then subtracting a second amount of time from the estimated time of departure to thereby generate the target time of departure of the selected airline flight, wherein the second amount of time equals at least the full difference between the flight-planned and scheduled block times.

10. The method of claim 5, wherein providing one or more functional alerts specific to the selected airline flight further comprises:

determining whether the difference between the flight-planned block time and the scheduled block time can be calculated, comprising:
determining whether a difference between a current time and the scheduled time of departure is greater than a predetermined time period;
wherein if the difference between the current time and the scheduled time of departure is greater than the predetermined time period, then it is determined that the difference between the flight-planned block time and the scheduled block time cannot be calculated.

11. A system comprising:

means for receiving data associated with a selected airline flight from one or more data sources, the selected airline flight having an estimated time of departure from a departure gate;

means for outputting one or more parameters in response to receiving data associated with the selected airline flight, comprising:
means for displaying one or more parameters associated with the selected airline flight on an output device; and
means for during displaying one or more parameters associated with the selected airline flight on the output device, displaying on the output device at least two of the following:
one or more parameters associated with alternate flights;
one or more parameters associated with inbound flight connections;
one or more parameters associated with downline flight connections;
one or more parameters associated with passenger connections;
one or more parameters associated with inbound crew; and
one or more parameters associated with inbound aircraft; and means for providing one or more functional alerts specific to the selected airline flight, comprising:
means for determining if there is a change in the estimated time of departure of the selected airline flight;
means for if there is a change in the estimated time of departure of the selected airline flight, then providing a functional alert regarding the change in the estimated time of departure of the selected airline flight, comprising:
means for displaying a first alert output on the output device in response to the change in the estimated time of departure to thereby provide a first immediate notification, the first alert output comprising a first dialog box, the first dialog box including a first message indicating that the estimated time of departure of the selected airline flight has changed;
wherein the first dialog box is at least partially displayed over, and/or otherwise interrupts, any other output displayed on the output device; and
wherein closure of the first dialog box requires a first affirmative action, thereby requiring acknowledgment of the change in the estimated time of departure of the selected airline flight;
means for determining if there is a change in the departure gate of the selected airline flight;
means for if there is a change in the departure gate of the selected airline flight, then providing a functional alert regarding the change in the departure gate of the selected airline flight, comprising:
means for displaying a second alert output on the output device in response to the change in the departure gate to thereby provide a second immediate notification, the second alert output comprising a second dialog box, the second dialog box including a second message indicating that the departure gate of the selected airline flight has changed;
wherein the second dialog box is at least partially displayed over, and/or otherwise interrupts, any other output displayed on the output device; and
wherein closure of the second dialog box requires a second affirmative action, thereby requiring acknowledgment of the change in the departure gate of the selected airline flight;
means for determining if there is a cancellation of the selected airline flight; and
means for if there is a cancellation of the selected airline flight, then providing a functional alert regarding the cancellation of the selected airline flight, comprising:
means for displaying a third alert output on the output device in response to the cancellation to thereby provide a third immediate notification, the third alert output comprising a third dialog box, the third dialog box including a third message indicating that the selected airline flight has been canceled;
wherein the third dialog box is at least partially displayed over, and/or otherwise interrupts, any other output displayed on the output device; and
wherein closure of the third dialog box requires a third affirmative action, thereby requiring acknowledgment of the cancellation of the selected airline flight;

wherein the selected airline flight further has a scheduled time of departure from the departure gate, a scheduled time of arrival at an arrival gate, an estimated time of arrival at the arrival gate, a flight-planned block time equaling a first time period that begins at the estimated time of departure and ends at the estimated time of arrival, and a scheduled block time equaling a second time period that begins at the scheduled time of departure and ends at the scheduled time of arrival; and wherein means for providing one or more functional alerts specific to the selected airline flight further comprises:
means for:
determining if there is a difference between the flight-planned block time and the scheduled block time;
if there is a difference between the flight-planned block time and the scheduled block time, then:

generating a target time of departure of the selected airline flight; and displaying on the output device the target time of departure of the selected airline flight;

if the flight-planned block time is shorter than the scheduled block time, then:

displaying on the output device and proximate the displayed target time a message indicating that the departure of the selected airline flight can be delayed until the target time of departure;

wherein the displayed target time is later in time than each of the scheduled time of departure and the estimated time of departure; and if the flight-planned block time is longer than the scheduled block time, then:

displaying on the output device and proximate the displayed target time a message recommending that the selected airline flight depart earlier at the target time of departure;

wherein the displayed target time is earlier in time than each of the scheduled time of departure and the estimated time of departure;

and if the flight-planned block time and the scheduled block time are substantially equal, then displaying on the output device a message indicating that the selected airline flight is to depart on schedule.

12. The system of claim 11 further comprising:

means for displaying selectable first, second, third and fourth symbols on the output device;

means for during the display of the one or more parameters associated with the selected airline flight, displaying on the output device the one or more parameters associated with the inbound flight connections in response to the selection of the first symbol;

means for during the display of the one or more parameters associated with the selected airline flight, displaying on the output device the one or more parameters associated with the downline flight connections in response to the selection of the second symbol;

means for during the display of the one or more parameters associated with the selected airline flight, displaying on the output device the one or more parameters associated with the passenger connections in response to the selection of the third symbol; and means for during the display of the one or more parameters associated with the selected airline flight, displaying on the output device the one or more parameters associated with the inbound aircraft in response to the selection of the fourth symbol.

13. The system of claim 11 wherein means for receiving data associated with the selected airline flight from one or more data sources comprises:

means for selecting a station at which the departure gate is located;

means for selecting the departure gate;

means for searching for flights departing from the departure gate;

means for displaying on the output device the flights departing from the departure gate;

means for selecting one of the flights departing from the departure gate, wherein the selected airline flight is the one of the flights departing from the departure gate; and means for loading data for the selected airline flight.

14. The system of claim 11 further comprising:

means for providing an operational data source and forecasting engine;

means for forecasting one or more times using the engine;

wherein the times are associated with a plurality of transportation transactions, the plurality of transportation transactions comprising the selected airline flight;

wherein means for receiving data associated with the selected airline flight from one or more data sources further comprises:

means for issuing a query for data associated with the selected airline flight using the engine; and means for continually updating the loaded data for the selected airline flight by repeatedly issuing the query at a predetermined time interval; and wherein the parameters displayed on the output device are updated at the predetermined interval.

15. The system of claim 11, wherein means for generating the target time of departure of the selected airline flight comprises:

means for if the flight-planned block time is shorter than the scheduled block time, then adding a first amount of time to the estimated time of departure to thereby generate the target time of departure of the selected airline flight, wherein the first amount of time equals at least a percentage of the difference between the flight-planned and scheduled block times; and means for if the flight-planned block time is longer than the scheduled block time, then subtracting a second amount of time from the estimated time of departure to thereby generate the target time of departure of the selected airline flight, wherein the second amount of time equals at least the full difference between the flight-planned and scheduled block times.

16. The system of claim 11, wherein means for providing one or more functional alerts specific to the selected airline flight further comprises:

means for determining whether the difference between the flight-planned block time and the scheduled block time can be calculated, comprising:

means for determining whether a difference between a current time and the scheduled time of departure is greater than a predetermined time period;

wherein if the difference between the current time and the scheduled time of departure is greater than the predetermined time period, then it is determined that the difference between the flight-planned block time and the scheduled block time cannot be calculated.

17. A system comprising:

a computer readable medium that is non-transitory, the computer readable medium comprising a plurality of instructions stored therein and executable by one or more processors, the plurality of instructions comprising:

instructions for receiving data associated with a selected airline flight from one or more data sources, the selected airline flight having an estimated time of departure from a departure gate;

instructions for outputting one or more parameters in response to receiving data associated with the selected airline flight, comprising:

instructions for displaying one or more parameters associated with the selected airline flight on an output device; and instructions for during displaying one or more parameters associated with the selected airline flight on the output device, displaying on the output device at least two of the following:

one or more parameters associated with alternate flights;

one or more parameters associated with inbound flight connections;
one or more parameters associated with downline flight connections;
one or more parameters associated with passenger connections;
one or more parameters associated with inbound crew; and
one or more parameters associated with inbound aircraft; and instructions for providing one or more functional alerts specific to the selected airline flight, comprising:
instructions for determining if there is a change in the estimated time of departure of the selected airline flight;
instructions for if there is a change in the estimated time of departure of the selected airline flight, then providing a functional alert regarding the change in the estimated time of departure of the selected airline flight, comprising:
instructions for displaying a first alert output on the output device in response to the change in the estimated time of departure to thereby provide a first immediate notification, the first alert output comprising a first dialog box, the first dialog box including a first message indicating that the estimated time of departure of the selected airline flight has changed;
wherein the first dialog box is at least partially displayed over, and/or otherwise interrupts, any other output displayed on the output device; and
wherein closure of the first dialog box requires a first affirmative action, thereby requiring acknowledgment of the change in the estimated time of departure of the selected airline flight;
instructions for determining if there is a change in the departure gate of the selected airline flight;
instructions for if there is a change in the departure gate of the selected airline flight, then providing a functional alert regarding the change in the departure gate of the selected airline flight, comprising:
instructions for displaying a second alert output on the output device in response to the change in the departure gate to thereby provide a second immediate notification, the second alert output comprising a second dialog box, the second dialog box including a second message indicating that the departure gate of the selected airline flight has changed;
wherein the second dialog box is at least partially displayed over, and/or otherwise interrupts, any other output displayed on the output device; and
wherein closure of the second dialog box requires a second affirmative action, thereby requiring acknowledgment of the change in the departure gate of the selected airline flight;
instructions for determining if there is a cancellation of the selected airline flight; and
instructions for if there is a cancellation of the selected airline flight, then providing a functional alert regarding the cancellation of the selected airline flight, comprising:
instructions for displaying a third alert output on the output device in response to the cancellation to thereby provide a third immediate notification, the third alert output comprising a third dialog box, the third dialog box including a third message indicating that the selected airline flight has been canceled;
wherein the third dialog box is at least partially displayed over, and/or otherwise interrupts, any other output displayed on the output device; and
wherein closure of the third dialog box requires a third affirmative action, thereby requiring acknowledgment of the cancellation of the selected airline flight;

wherein the selected airline flight further has a scheduled time of departure from the departure gate, a scheduled time of arrival at an arrival gate, an estimated time of arrival at the arrival gate, a flight-planned block time equaling a first time period that begins at the estimated time of departure and ends at the estimated time of arrival, and a scheduled block time equaling a second time period that begins at the scheduled time of departure and ends at the scheduled time of arrival; and wherein instructions for providing one or more functional alerts specific to the selected airline flight further comprise:
instructions for:
determining if there is a difference between the flight-planned block time and the scheduled block time;
if there is a difference between the flight-planned block time and the scheduled block time, then:
generating a target time of departure of the selected airline flight; and
displaying on the output device the target time of departure of the selected airline flight;
if the flight-planned block time is shorter than the scheduled block time, then:
displaying on the output device and proximate the displayed target time a message indicating that the departure of the selected airline flight can be delayed until the target time of departure;
wherein the displayed target time is later in time than each of the scheduled time of departure and the estimated time of departure; and
if the flight-planned block time is longer than the scheduled block time, then:
displaying on the output device and proximate the displayed target time a message recommending that the selected airline flight depart earlier at the target time of departure;
wherein the displayed target time is earlier in time than each of the scheduled time of departure and the estimated time of departure;
and
if the flight-planned block time and the scheduled block time are substantially equal, then displaying on the output device a message indicating that the selected airline flight is to depart on schedule.

18. The system of claim 17 further comprising:
an airline gate from which the selected airline flight is scheduled to depart; and
a user interface located at the airline gate, the user interface comprising the output device.

19. The system of claim 17 wherein the plurality of instructions further comprises:
instructions for displaying selectable first, second, third and fourth symbols on the output device;
instructions for during the display of the one or more parameters associated with the selected airline flight, displaying on the output device the one or more parameters associated with the inbound flight connections in response to the selection of the first symbol;

instructions for during the display of the one or more parameters associated with the selected airline flight, displaying on the output device the one or more parameters associated with the downline flight connections in response to the selection of the second symbol;

instructions for during the display of the one or more parameters associated with the selected airline flight, displaying on the output device the one or more parameters associated with the passenger connections in response to the selection of the third symbol; and instructions for during the display of the one or more parameters associated with the selected airline flight, displaying on the output device the one or more parameters associated with the inbound aircraft in response to the selection of the fourth symbol.

20. The system of claim 17 wherein instructions for receiving data associated with the selected airline flight from one or more data sources comprise:

instructions for selecting a station at which the departure gate is located;

instructions for selecting the departure gate;

instructions for searching for flights departing from the departure gate;

instructions for displaying on the output device the flights departing from the departure gate;

instructions for selecting one of the flights departing from the departure gate, wherein the selected airline flight is the one of the flights departing from the departure gate; and instructions for loading data for the selected airline flight.

21. The system of claim 17 further comprising:

an operational data source and forecasting engine;

wherein the plurality of instructions further comprises:

instructions for forecasting one or more times using the engine;

wherein the times are associated with a plurality of transportation transactions, the plurality of transportation transactions comprising the selected airline flight;

wherein instructions for receiving data associated with the selected airline flight from one or more data sources further comprise:

instructions for issuing a query for data associated with the selected airline flight using the engine; and instructions for continually updating the loaded data for the selected airline flight by repeatedly issuing the query at a predetermined time interval; and wherein the parameters displayed on the output device are updated at the predetermined interval.

22. The system of claim 17, wherein instructions for generating the target time of departure of the selected airline flight comprises:

instructions for if the flight-planned block time is shorter than the scheduled block time, then adding a first amount of time to the estimated time of departure to thereby generate the target time of departure of the selected airline flight, wherein the first amount of time equals at least a percentage of the difference between the flight-planned and scheduled block times; and instructions for if the flight-planned block time is longer than the scheduled block time, then subtracting a second amount of time from the estimated time of departure to thereby generate the target time of departure of the selected airline flight, wherein the second amount of time equals at least the full difference between the flight-planned and scheduled block times.

23. The system of claim 17, wherein instructions for providing one or more functional alerts specific to the selected airline flight further comprises:

instructions for determining whether the difference between the flight-planned block time and the scheduled block time can be calculated, comprising:

instructions for determining whether a difference between a current time and the scheduled time of departure is greater than a predetermined time period;

wherein if the difference between the current time and the scheduled time of departure is greater than the predetermined time period, then it is determined that the difference between the flight-planned block time and the scheduled block time cannot be calculated.

\* \* \* \* \*